US008743482B1

(12) United States Patent
Tsai et al.

(10) Patent No.: US 8,743,482 B1
(45) Date of Patent: Jun. 3, 2014

(54) OPTICAL IMAGING LENS ASSEMBLY

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/773,645

(22) Filed: Feb. 22, 2013

(30) Foreign Application Priority Data

Dec. 28, 2012  (TW) .............................. 101151069 A

(51) Int. Cl.
*G02B 9/62* (2006.01)
(52) U.S. Cl.
USPC .......................................................... 359/757
(58) Field of Classification Search
CPC ........................................................ G02B 9/62
USPC ........................................ 359/708, 756, 757
See application file for complete search history.

(56) References Cited

U.S. PATENT DOCUMENTS

| 7,869,142 | B2 | 1/2011 | Chen et al. |
| 8,000,031 | B1 | 8/2011 | Tsai |
| 2012/0314304 | A1 | 12/2012 | Huang |
| 2013/0003193 | A1* | 1/2013 | Huang .......................... 359/713 |

* cited by examiner

*Primary Examiner* — Joseph P Martinez
(74) *Attorney, Agent, or Firm* — CKC & Partners Co., Ltd.

(57) ABSTRACT

An optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave object-side surface. The third lens element and the fourth lens element both have refractive power. The fifth lens element with refractive power has a concave object-side surface and a convex image-side surface, wherein at least one of the surfaces of the fifth lens element is aspheric. The sixth lens element with refractive power has a concave image-side surface, wherein the surfaces of the sixth lens element are aspheric, and the sixth lens element has at least one inflection point on the image-side surface thereof.

23 Claims, 19 Drawing Sheets

US 8,743,482 B1

OPTICAL IMAGING LENS ASSEMBLY

RELATED APPLICATIONS

The application claims priority to Taiwan Application Serial Number 101151069, filed Dec. 28, 2012, which is herein incorporated by reference.

BACKGROUND

1. Technical Field

The present disclosure relates to an optical imaging lens assembly. More particularly, the present disclosure relates to a compact optical imaging lens assembly applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure, such as U.S. Pat. No. 7,869,142 or a five-element lens structure, such as U.S. Pat. No. 8,000,031. Due to the popularity of mobile products with high-end specifications, such as smart phones and PDAs (Personal Digital Assistants), the pixel and image-quality requirements of the compact optical lens system have increased rapidly. However, the conventional four-element or five-element lens structure cannot satisfy the requirements of the compact optical lens system.

Another conventional compact optical lens system has six-element lens structure, such as U.S. Publication No. 2012/0314304 A1. However, the second lens element does not have negative refractive power for correcting the chromatic aberration of the optical lens system. Moreover, the shape of the object-side surface can not corrected the astigmatism, and the excessive aberration also hardly be corrected.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave object-side surface. The third lens element has refractive power. The fourth lens element has refractive power. The fifth lens element with refractive power has a concave object-side surface and a convex image-side surface, wherein at least one of the object-side surface and the image-side surface of the fifth lens element is aspheric. The sixth lens element with refractive power has a concave image-side surface, wherein an object-side surface and the image-side surface of the sixth lens element are aspheric, and the sixth lens element has at least one inflection point on the image-side surface thereof. When a curvature radius of the object-side surface of the second lens element is R3, a curvature radius of an image-side surface of the second lens element is R4, a focal length of the optical imaging lens assembly is f, and a focal length of the fifth lens element is f5, the following relationships are satisfied:

$-5.0 < (R3+R4)/(R3-R4) < -0.4$; and $-1.5 < f/f5 < 0.8$.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
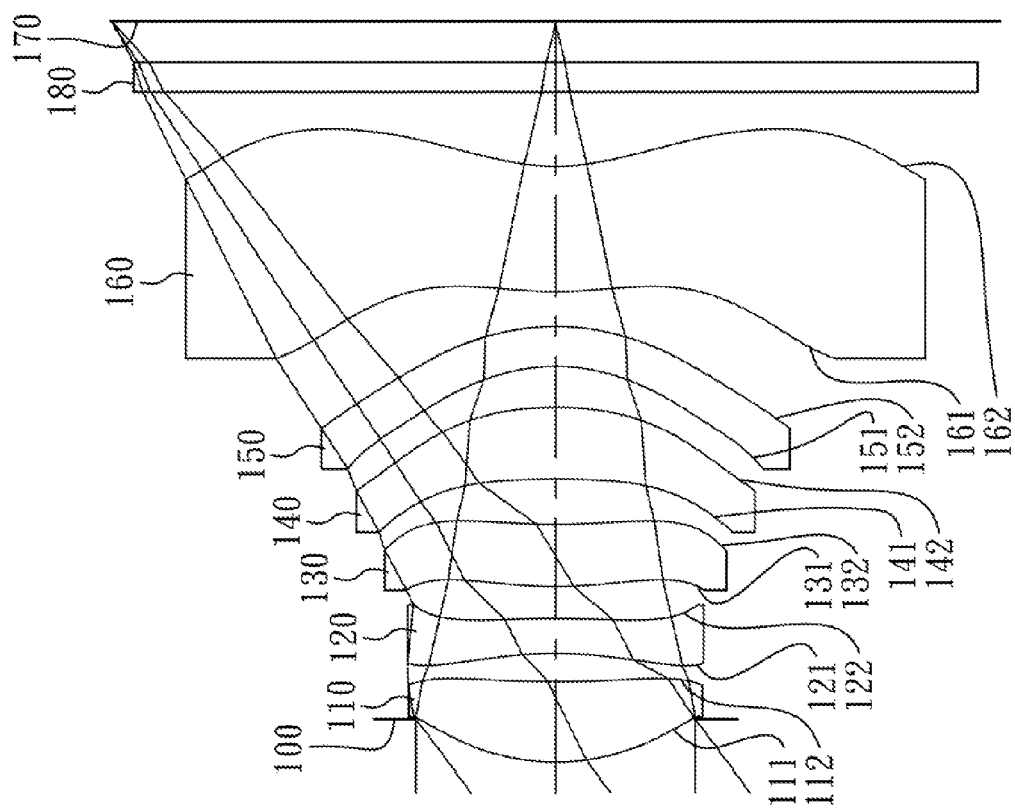
FIG. 1 is a schematic view of an optical imaging lens assembly according to the 1st embodiment of the present disclosure.

An optical imaging lens assembly includes, in order from an object side to an image side, a first lens element, a second lens element, a third lens element, a fourth lens element, a fifth lens element and a sixth lens element.

The first lens element with positive refractive power has a convex object-side surface, and can have a concave image-side surface. Therefore, the total track length of the optical imaging lens assembly can be reduced by properly adjusting the positive refractive power of the first lens element.

The second lens element with negative refractive power corrects the chromatic aberration generated from the light passing through the first lens element. The second lens element has a concave object-side surface, and can have a convex image-side surface, so that the astigmatism can be corrected. At least one of the object-side surface and the image-side surface of the second lens element has at least one inflection point, so that it is favorable for effectively reducing the angle at which the incident light projects onto an image sensor from the off-axis field to improve the image-sensing efficiency of the image sensor.

The third lens element can have a convex object-side surface, wherein the object-side surface of the third lens element can change from convex at a paraxial region thereof to concave at a peripheral region thereof. Therefore, the aberration of the off-axis field can be corrected.

The fourth lens element can have positive refractive power and a convex image-side surface, so that the photosensitivity of the optical imaging lens assembly can be reduced for increasing the manufacturing yield rate.

The fifth lens element has a concave object-side surface and a convex image-side surface, and can have negative refractive power. Therefore, the Petzval sum of the optical imaging lens assembly can be corrected effectively, so that the central field and the peripheral field of view can be better focused on the image plane with higher resolving power.

The sixth lens element has a concave image-side surface, and can have negative refractive power and a convex object-side surface. Therefore, the principal point of the optical imaging lens assembly can be positioned away from the image plane, and the back focal length thereof can be reduced so as to keep the compact size of the optical imaging lens assembly. The sixth lens element has at least one inflection point on the image-side surface thereof, so that the angle at which the incident light projects onto the image sensor from the off-axis field can be effectively reduced to increase the image-sensing efficiency of the image sensor, and the aberration of the off-axis field can be further corrected.

When a curvature radius of the object-side surface of the second lens element is R3, and a curvature radius of the image-side surface of the second lens element is R4, the following relationship is satisfied:

$-5.0<(R3+R4)/(R3-R4)<-0.4$.

By such arrangement, the curvature of the object-side surface of the second lens element is greater than the curvature of the image-side surface thereof, so that the astigmatism can be corrected and the aberrations can be improved.

R3 and R4 can further satisfy the following relationship:

$-3.5<(R3+R4)/(R3-R4)<-0.75$.

Moreover, R3 and R4 can satisfy the following relationship:

$-2.5<(R3+R4)/(R3-R4)<-0.95$.

When a focal length of the optical imaging lens assembly is f, and a focal length of the fifth lens element is f5, the following relationship is satisfied:

$-1.5 \leq f/f5 \leq 0.8$.

Therefore, the Petzval sum of the optical imaging lens assembly can be corrected effectively, so that the central field and the peripheral field of view can be better focused on the image plane with higher resolving power.

f and f5 can further satisfy the following relationship:

$-1.2<f/f<0.4$.

When a central thickness of the third lens element is CT3, and a central thickness of the sixth lens element is CT6, the following relationship is satisfied:

$0<CT3/CT6<1.0$.

Therefore, the thicknesses of the lens elements are thereby favorable for manufacturing processes of the optical imaging lens assembly, and can keep the compact size thereof.

When a curvature radius of the object-side surface of the third lens element is R5, a curvature radius of an image-side surface of the third lens element is R6, a curvature radius of the object-side surface of the fifth lens element is R9, and a curvature radius of the image-side surface of the fifth lens element is R10, the following relationship is satisfied:

$|(R5-R6)/(R5+R6)|+|(R9-R10)/(R9+R10)|<0.70$.

Therefore, the aberration of the optical imaging lens assembly can be corrected, and the photosensitivity thereof can be reduced.

The optical imaging lens assembly further includes a stop, such as an aperture stop. When an axial distance between the stop and the image-side surface of the sixth lens element is SD, and an axial distance between the object-side surface of the first lens element and the image-side surface of the sixth lens element is TD, the following relationship is satisfied:

$0.80<SD/TD<1.05$.

Therefore, the optical imaging lens assembly can have a good balance between the telecentric and wide-angle functionalities, as well as a desirable total track length and sufficient field of view of the optical imaging lens assembly.

When the focal length of the fifth lens element is f5, and a focal length of the sixth lens element is f6, the following relationship is satisfied:

$-0.3<f6/f5<1.1$.

Therefore, the resolving power of the optical imaging lens assembly can be enhanced, and the back focal length of the optical imaging lens assembly can be reduced for keeping a compact size thereof.

When an Abbe number of the second lens element is V2, and an Abbe number of the fifth lens element is V5, the following relationship is satisfied:

$30<V2+V5<57$.

Therefore, the chromatic aberration can be corrected.

When an axial distance between the image-side surface of the sixth lens element and the image plane is BFL, and an axial distance between the object-side surface of the first lens element and the image plane is TTL, the following relationship is satisfied:

$0.10<BFL/TTL<0.23$.

Therefore, the back focal length of the optical imaging lens assembly can be properly adjusted so as to keep the compact size thereof.

When an axial distance between the fourth lens element and the fifth lens element is T45, a central thickness of the fifth lens element is CT5, and a distance in parallel with an optical axis from a maximum effective diameter position on the object-side surface of the fifth lens element to an axial vertex on the object-side surface of the fifth lens element is SAG51, the following relationship is satisfied:

$$-2.5<(T45+SAG51)/CT5<-0.9.$$

Therefore, it is not only favorable for manufacturing and assembling of the lens elements, but also reduces the required space for assembling the lens elements.

When a sum of the central thicknesses of the first lens element, the second lens element, the third lens element, the fourth lens element, the fifth lens element and the sixth lens element is ΣCT, and an axial distance between the object-side surface of the first lens element and the image-side surface of the sixth lens element is TD, the following relationship is satisfied:

$$0.65<\Sigma CT/TD<0.85.$$

Therefore, the compact size of the optical imaging lens assembly can be maintained.

According to the optical imaging lens assembly of the present disclosure, to the lens elements thereof can be made of glass or plastic material. When the lens elements are made of glass material, the distribution of the refractive power of the optical imaging lens assembly may be more flexible to design. When the lens elements are made of plastic material, the manufacturing costs can be effectively reduced. Furthermore, surfaces of each lens element can be aspheric, so that it is easier to make the surfaces into non-spherical shapes. As a result, more controllable variables are obtained, and the aberration as well as the number of required lens elements can be reduced while constructing an optical system. Therefore, the total track length of the optical imaging lens assembly can also be reduced.

According to the optical imaging lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the optical imaging lens assembly of the present disclosure, the optical imaging lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the optical imaging lens assembly of the present disclosure, it can be utilized for various imaging applications, such as three dimensions image capturing, digital cameras, mobile devices, tablets etc.

According to the above description of the present disclosure, the following 1st-9th specific embodiments are provided for further explanation.

1st Embodiment

Figure 2:
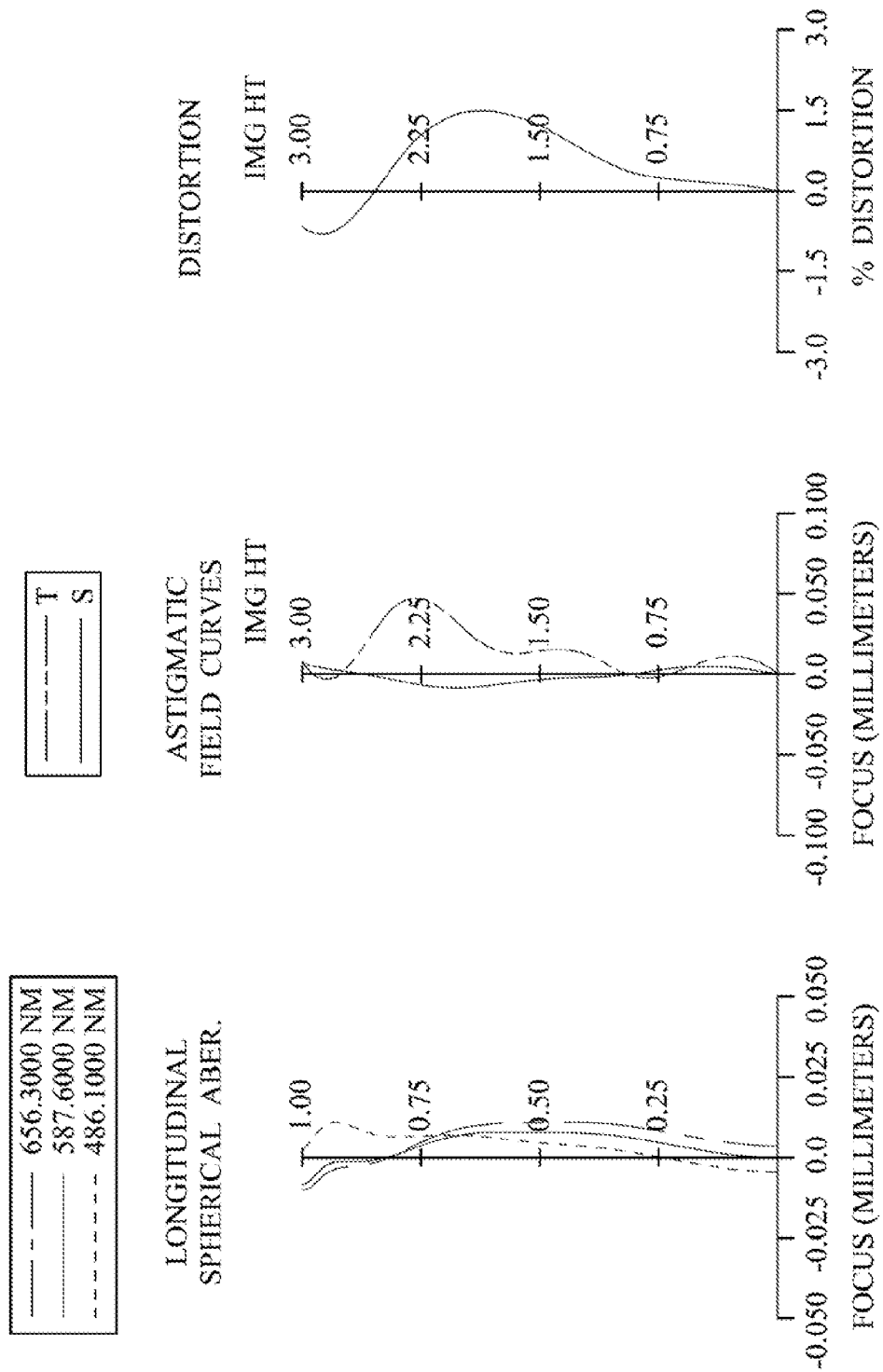
FIG. 2 shows spherical aberration curves, astigmatic field curves and a distortion curve of the optical imaging lens assembly according to the 1st embodiment.

FIG. 1 is a schematic view of an optical imaging lens assembly according to the 1st embodiment of the present disclosure. FIG. 2 shows spherical aberration curves, astigmatic field curves and a distortion curve of the optical imaging lens assembly according to the 1st embodiment. In FIG. 1, the optical imaging lens assembly includes, in order from an object side to an image side, a stop, which is an aperture stop 100, followed by a first lens element 110, a second lens element 120, a third lens element 130, a fourth lens element 140, a fifth lens element 150, a sixth lens element 160, an IR-cut filter 180 and an image plane 170.

The first lens element 110 with positive refractive power has a convex object-side surface 111 and a concave image-side surface 112. The first lens element 110 is made of plastic material, and has the object-side surface 111 and the image-side surface 112 being both aspheric.

The second lens element 120 with negative refractive power has a concave object-side surface 121 and a convex image-side surface 122. The second lens element 120 is made of plastic material, and has the object-side surface 121 and the image-side surface 122 being both aspheric. Furthermore, the second lens element 120 has inflection points on the object-side surface 121 and the image-side surface 122 thereof.

The third lens element 130 with positive refractive power has a convex object-side surface 131 and a concave image-side surface 132, wherein the object-side surface 131 changes from convex at a paraxial region thereof to concave at a peripheral region thereof. The third lens element 130 is made of plastic material, and has the object-side surface 131 and the image-side surface 132 being both aspheric.

The fourth lens element 140 with positive refractive power has a concave object-side surface 141 and a convex image-side surface 142. The fourth lens element 140 is made of plastic material, and has the object-side surface 141 and the image-side surface 142 being both aspheric.

The fifth lens element 150 with negative refractive power has a concave object-side surface 151 and a convex image-side surface 152. The fifth lens element 150 is made of plastic material, and has the object-side surface 151 and the image-side surface 152 being both aspheric.

The sixth lens element 160 with negative refractive power has a convex object-side surface 161 and a concave image-side surface 162. The sixth lens element 160 is made of plastic material, and has the object-side surface 161 and the image-side surface 162 being both aspheric. Furthermore, the sixth lens element 160 has at least one inflection point on the image-side surface 162 to thereof.

The IR-cut filter 180 is made of glass material and located between the sixth lens element 160 and the image plane 170, and will not affect the focal length of the optical imaging lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

wherein,

X is the relative distance between a point on the aspheric surface spaced at a distance V from the optical axis and the tangential plane at the aspheric surface vertex on the optical axis:

Y is the distance from the point on the curve of the aspheric surface to the optical axis;

R is the curvature radius;

k is the conic coefficient; and

Ai is the i-th aspheric coefficient.

In the optical imaging lens assembly according to the 1st embodiment, when a focal length of the optical imaging lens assembly is f, an f-number of the optical imaging lens assembly is Fno, and half of the maximal field of view of the optical imaging lens assembly is HFOV, these parameters have the following values:

f=4.05 mm;

Fno=2.15; and

HFOV=35.7 degrees.

In the optical imaging lens assembly according to the 1st embodiment, when an Abbe number of the second lens element 120 is V2, and an Abbe number of the fifth lens element 150 is V5, the following relationship is satisfied:

$V2+V5=46.6$,

In the optical imaging lens assembly according to the 1st embodiment, when a central thickness of the third lens element 130 is CT3, and a central thickness of the sixth lens element 160 is CT6, the following relationship is satisfied:

$CT3/CT6=0.50$.

Figure 19:
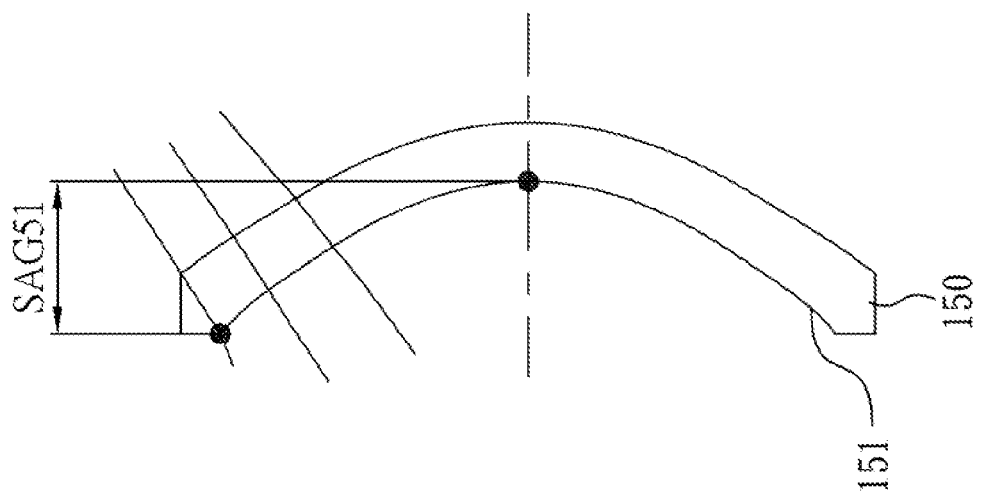
FIG. 19 is a schematic view of SAG51 of the fifth lens element of FIG. 1.

FIG. 19 is a schematic view of SAG51 of the fifth lens element 150 of FIG. 1. In FIG. 19, when a displacement in parallel with an optical axis from a maximum effective diameter position on the object-side surface 151 of the fifth lens element 150 to an axial vertex on the object-side surface 151 of the fifth lens element 150 is SAG51 (SAG51 is negative when the displacement toward the object side; SAG51 is positive when the displacement toward the image side), an axial distance between the fourth lens element 140 and the fifth lens element 150 is T45, and a central thickness of the fifth lens element 150 is CT5, the following relationship is satisfied:

$(T45+SAG51)/CT5=-1.58$.

In the optical imaging lens assembly according to the 1st embodiment, when a curvature radius of the object-side surface 121 of the second lens element 120 is R3, and a curvature radius of the image-side surface 122 of the second lens element 120 is R4, the following relationship is satisfied:

$(R3+R4)/(R3-R4)=-1.92$.

In the optical imaging lens assembly according to the 1st embodiment, when a curvature radius of the object-side surface 131 of the third lens element 130 is R5, a curvature radius of the image-side surface 132 of the third lens element 130 is R6, a curvature radius of the object-side surface 151 of the fifth lens element 150 is R9, and a curvature radius of the image-side surface 152 of the fifth lens element 150 is R10, the following relationship is satisfied:

$|(R5-R6)/(R5+R6)|+|(R9-R10)/(R9+R10)|=0.37$.

In the optical imaging lens assembly according to the 1st embodiment, when the focal length of the optical imaging lens assembly is f, a focal length of the fifth lens element 150 is f5, and a focal length of the sixth lens element 160 is f6, the following relationships are satisfied:

$f/f5=-0.33$; and $f6/f5=0.59$.

In the optical imaging lens assembly according to the 1st embodiment, when an axial distance between the aperture stop 100 and the image-side surface 162 of the sixth lens element 160 is SD, an axial distance between the object-side surface 111 of the first lens element 110 and the image-side surface 162 of the sixth lens element 160 is TD, and a sum of central thicknesses of the first lens element 110, the second lens element 120, the third lens element 130, the fourth lens element 140, the fifth lens element 150 and the sixth lens element 160 is ΣCT, the following relationships are satisfied:

$SD/TD=093$; and $\Sigma CT/TD=070$.

In the optical imaging lens assembly according to the 1st embodiment, when an axial distance between the image-side surface 162 of the sixth lens element 160 and the image plane 170 is BFL and an axial distance between the object-side surface 111 of the first lens element 110 and the image plane 170 is TTL, the following relationship is satisfied:

$BFL/TTL=0.18$.

The detailed optical data of the 1st embodiment are shown in Table 1 and the aspheric surface data are shown in Table 2 below.

TABLE 1

| 1st Embodiment f = 4.05 mm, Fno = 2.15, HFOV = 36.7 deg. | | | | | | | |
|---|---|---|---|---|---|---|---|
| Surface # | | Curvature Radius | | Thickness | Material | Index | Abbe # | Focal Length |

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.292 | | | | |
| 2 | Lens 1 | 1.517 | ASP | 0.546 | Plastic | 1.544 | 55.9 | 3.41 |
| 3 | | 7.235 | ASP | 0.190 | | | | |
| 4 | Lens 2 | −2.698 | ASP | 0.235 | Plastic | 1.640 | 23.3 | −6.25 |
| 5 | | −8.562 | ASP | 0.214 | | | | |
| 6 | Lens 3 | 2.872 | ASP | 0.423 | Plastic | 1.544 | 55.9 | 12.52 |
| 7 | | 4.706 | ASP | 0.305 | | | | |
| 8 | Lens 4 | −6.522 | ASP | 0.483 | Plastic | 1.544 | 55.9 | 6.15 |
| 9 | | −2.270 | ASP | 0.278 | | | | |
| 10 | Lens 5 | −1.197 | ASP | 0.265 | Plastic | 1.640 | 23.3 | −12.17 |
| 11 | | −1.536 | ASP | 0.238 | | | | |

TABLE 1-continued

1st Embodiment
f = 4.05 mm, Fno = 2.15, HFOV = 36.7 deg.

| Surface # | | Curvature Radius | Thickness | Material | Index | Abbe # | Focal Length |
|---|---|---|---|---|---|---|---|
| 12 | Lens 6 | 2.515 ASP | 0.844 | Plastic | 1.544 | 55.9 | −7.22 |
| 13 | | 1.352 ASP | 0.500 | | | | |
| 14 | IR-cut filter | Plano | 0.200 | Glass | 1.517 | 64.2 | — |
| 15 | | Plano | 0.281 | | | | |
| 16 | Image | Plano | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | 2.1718E−02 | 3.0000E+00 | −1.8058E+01 | −1.0000E+00 | 1.3131E−01 | 3.0000E+00 |
| A4 = | −5.1913E−03 | −3.9825E−02 | −1.5116E−02 | 6.2549E−02 | −1.8557E−01 | −1.2876E−01 |
| A6 = | 2.2215E−02 | 5.0353E−03 | 1.3457E−01 | 1.1708E−01 | 4.2769E−02 | 6.6064E−03 |
| A8 = | −5.1482E−02 | −7.7262E−02 | −8.6758E−02 | 3.1985E−01 | −6.8506E−04 | −4.3380E−02 |
| A10 = | −5.9448E−03 | −1.2204E−02 | −1.1515E−01 | −1.9542E−01 | −1.0213E−01 | −1.0349E−02 |
| A12 = | 7.1311E−02 | 4.7188E−02 | 2.1814E−01 | 2.4263E−01 | 4.3757E−02 | 1.0811E−02 |
| A14 = | −7.9772E−02 | −2.0493E−02 | −6.9782E−02 | −6.4119E−02 | 1.0394E−03 | −1.6154E−04 |

| Surface # | 8 | 9 | 10 | 11 | 12 | 13 |
|---|---|---|---|---|---|---|
| k = | 1.6742E+00 | 8.1817E−01 | −4.3944E+00 | −5.9382E−01 | −3.0000E+01 | −6.8342E+00 |
| A4 = | −1.2394E−01 | −1.1767E−01 | −7.1436E−02 | 6.0491E−02 | −1.7256E−01 | −6.4734E−02 |
| A6 = | 1.8591E−03 | 1.8986E−02 | −1.3380E−01 | −5.3842E−02 | 7.2724E−02 | 2.5577E−02 |
| A8 = | 9.0964E−03 | 7.8339E−03 | 1.9170E−01 | 1.9686E−02 | −4.1850E−02 | −9.1515E−03 |
| A10 = | −4.7428E−02 | 2.2227E−02 | −5.6516E−02 | 1.0200E−02 | 2.0935E−02 | 2.3031E−03 |
| A12 = | −1.9387E−02 | −4.6067E−03 | −1.2708E−02 | −2.5481E−03 | −5.8621E−03 | −3.8261E−04 |
| A14 = | 9.0085E−02 | −2.7538E−03 | 4.5799E−03 | −2.4793E−03 | 8.5267E−04 | 3.5683E−05 |
| A16 = | −3.9867E−02 | 2.1404E−04 | 4.0935E−04 | 7.0449E−04 | −5.0967E−05 | −1.3416E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
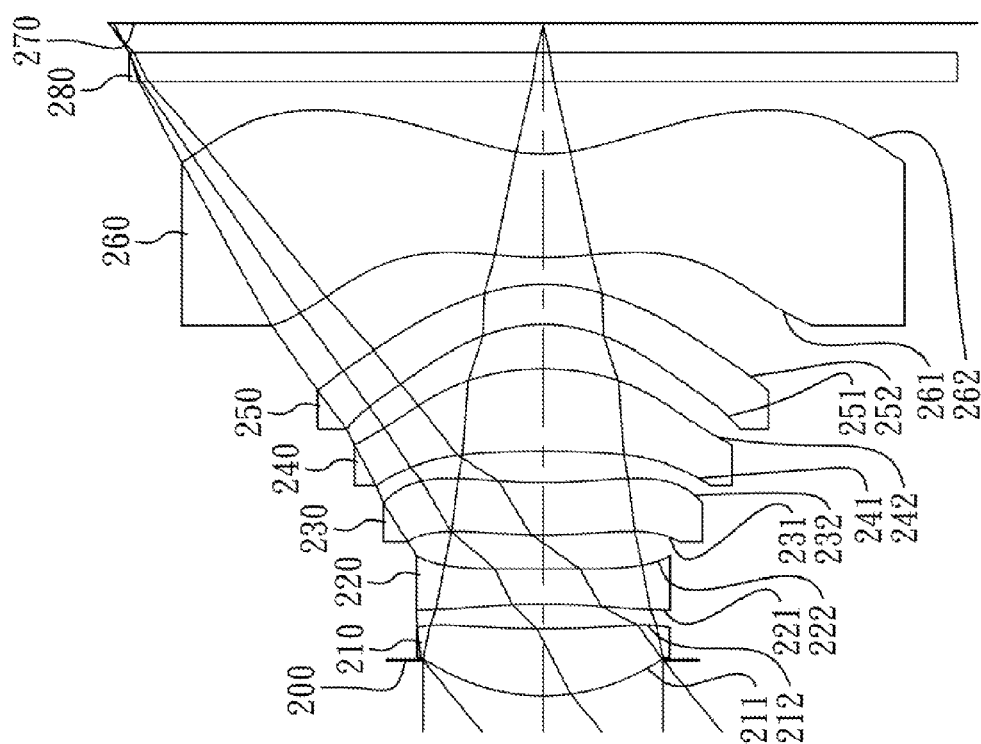
FIG. 3 is a schematic view of an optical imaging lens assembly according to the 2nd embodiment of the present disclosure.
Figure 4:
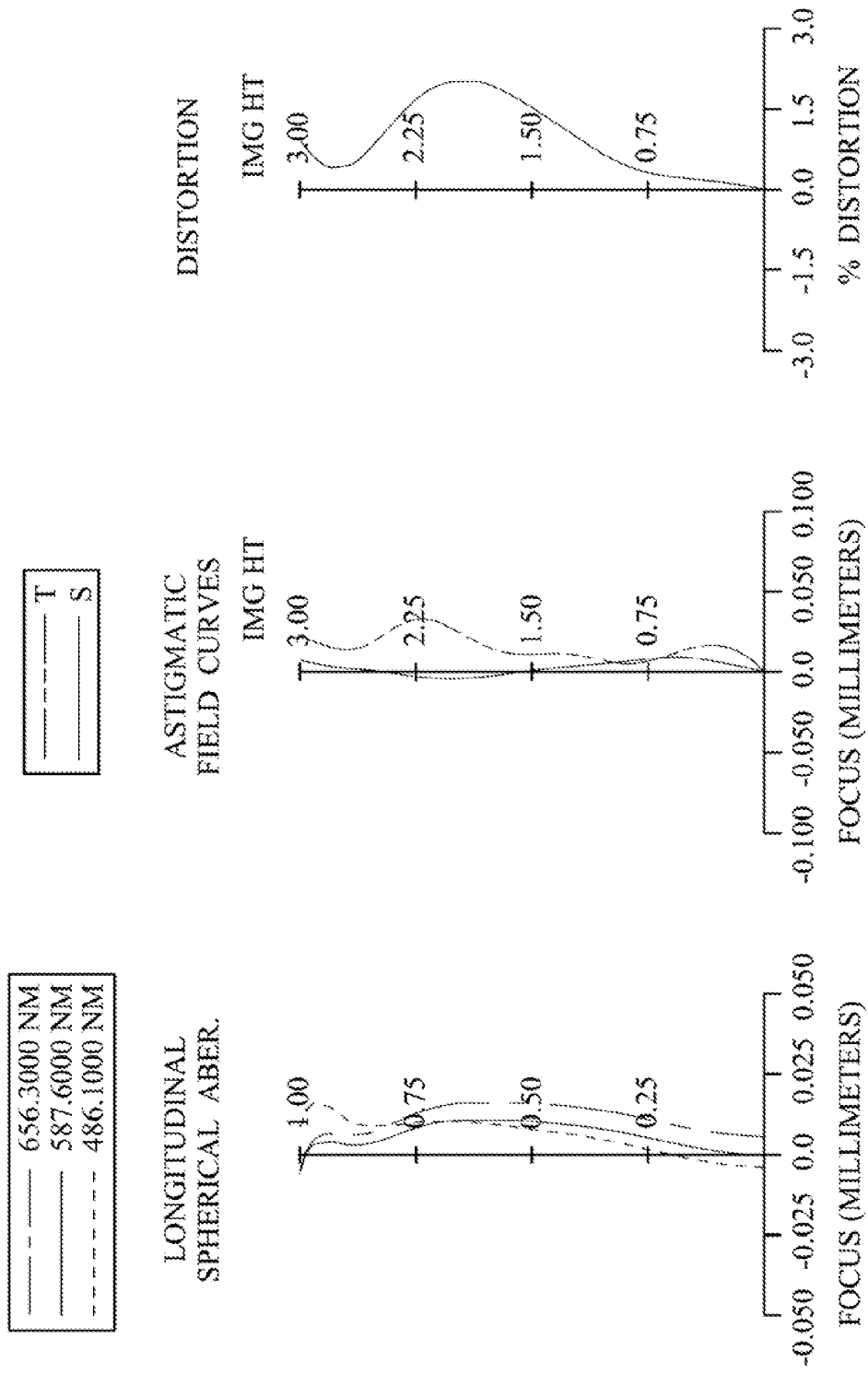
FIG. 4 shows spherical aberration curves, astigmatic field curves and a distortion curve of the optical imaging lens assembly according to the 2nd embodiment.

FIG. 3 is a schematic view of an optical imaging lens assembly according to the 2nd embodiment of the present disclosure. FIG. 4 shows spherical aberration curves, astigmatic field curves and a distortion curve of the optical imaging lens assembly according to the 2nd embodiment. In FIG. 3, the optical imaging lens assembly includes, in order from an object side to an image side, a stop, which is an aperture stop 200, followed by a first lens element 210, a second lens element 220, a third lens element 230, a fourth lens element 240, a fifth lens element 250, a sixth lens element 260, an IR-cut filter 280 and an image plane 270.

The first lens element 210 with positive refractive power has a convex object-side surface 211 and a concave image-side surface 212. The first lens element 210 is made of plastic material, and has the object-side surface 211 and the image-side surface 212 being both aspheric.

The second lens element 220 with negative refractive power has a concave object-side surface 221 and a concave image-side surface 222. The second lens element 220 is made of plastic material, and has the object-side surface 221 and the image-side surface 222 being both aspheric. Furthermore, the second lens element 220 has inflection point on the object-side surface 221 thereof.

The third lens element 230 with positive refractive power has a convex object-side surface 231 and a concave image-side surface 232, wherein the object-side surface 231 changes from convex at a paraxial region thereof to concave at a peripheral region thereof. The third lens element 230 is made of plastic material, and has the object-side surface 231 and the age-side surface 232 being both aspheric.

The fourth lens element 240 with positive refractive power has a concave object-side surface 241 and a convex image-side surface 242. The fourth lens element 240 is made of plastic material, and has the object-side surface 241 and the image-side surface 242 being both aspheric.

The fifth lens element 250 with negative refractive power has a concave object-side surface 251 and a convex mage-side surface 252. The fifth lens element 250 is made of plastic material, and has the object-side surface 251 and the image-side surface 252 being both aspheric.

The sixth lens element 260 with negative refractive power has a convex object-side surface 261 and a concave image-side surface 262. The sixth lens element 260 is made of plastic material, and has the object-side surface 261 and the image-side surface 262 being both aspheric. Furthermore, the sixth lens element 260 has at least one inflection point on the image-side surface 262 thereof.

The IR-cut filter 280 is made of glass material and located between the sixth lens element 260 and the image plane 270, and will not affect the focal length of the optical imaging lens assembly.

The detailed optical data of the 2nd embodiment are shown in Table 3 and the aspheric surface data are shown in Table 4 below.

TABLE 3

2nd Embodiment
f = 3.85 mm, Fno = 2.20, HFOV = 39.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.246 | | | | |
| 2 | Lens 1 | 1.445 ASP | 0.465 | Plastic | 1.544 | 55.9 | 3.26 |
| 3 | | 6.928 ASP | 0.168 | | | | |
| 4 | Lens 2 | −5.093 ASP | 0.240 | Plastic | 1.650 | 21.4 | −7.31 |
| 5 | | 71.606 ASP | 0.238 | | | | |
| 6 | Lens 3 | 3.570 ASP | 0.364 | Plastic | 1.544 | 55.9 | 86.23 |
| 7 | | 3.726 ASP | 0.212 | | | | |
| 8 | Lens 4 | −11.576 ASP | 0.574 | Plastic | 1.544 | 55.9 | 3.88 |
| 9 | | 1.817 ASP | 0.304 | | | | |
| 10 | Lens 5 | −1.043 ASP | 0.280 | Plastic | 1.650 | 21.4 | −16.07 |
| 11 | | −1.281 ASP | 0.186 | | | | |
| 12 | Lens 6 | 2.365 ASP | 0.716 | Plastic | 1.535 | 55.7 | −4.88 |
| 13 | | 1.111 ASP | 0.500 | | | | |
| 14 | IR-cut filter | Plano | 0.200 | Glass | 1.517 | 64.2 | — |
| 15 | | Plano | 0.205 | | | | |
| 16 | Image | Plano | — | | | | |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k = | 1.6350E−01 | 1.6882E+00 | −2.5782E+01 | −3.1958E+00 | 0.0000E+00 | 0.0000E+00 |
| A4 = | −5.1913E−03 | −3.5038E−02 | −2.9546E−04 | 6.7500E−02 | −2.1232E−01 | −1.6474E−01 |
| A6 = | 1.5950E−02 | 1.4651E−02 | 1.4335E−01 | 1.8635E−01 | 4.9083E−02 | 2.5431E−02 |
| A8 = | −5.1482E−02 | −5.2901E−02 | −9.7359E−02 | 1.5317E−02 | 1.4369E−02 | −4.4588E−02 |
| A10 = | −5.9448E−03 | −3.0221E−02 | −1.5797E−01 | −2.9296E−01 | −1.0871E−01 | −1.1045E−02 |
| A12 = | 1.2955E−01 | −1.0540E−01 | 1.1444E−01 | 2.6780E−01 | 1.0767E−02 | 4.6945E−03 |
| A14 = | −1.9371E−01 | 7.3613E−02 | 9.0673E−02 | 3.5067E−02 | | |

| Surface # | 8 | 9 | 10 | 11 | 12 | 13 |
|---|---|---|---|---|---|---|
| k = | −1.0000E+00 | 3.5179E−01 | −2.9715E+00 | −7.9565E−01 | −3.0000E+01 | −6.0459E+00 |
| A4 = | −9.2752E−02 | −8.8856E−02 | −6.7194E−02 | 8.7366E−02 | −1.8026E−01 | −6.8341E−02 |
| A6 = | −1.3760E−02 | 2.6548E−02 | −1.1754E−01 | −5.6802E−02 | 7.3603E−02 | 2.7039E−02 |
| A8 = | 1.7244E−02 | 1.0665E−02 | 1.9169E−01 | 1.9174E−02 | −4.1769E−02 | −9.3407E−03 |
| A10 = | −4.2317E−02 | 2.3882E−02 | −5.8993E−02 | 9.8136E−03 | 2.0985E−02 | 2.3031E−03 |
| A12 = | −1.8084E−02 | −4.3820E−03 | −1.4143E−02 | −2.6991E−03 | −5.8539E−03 | −3.8393E−04 |
| A14 = | 8.9438E−02 | −3.0422E−03 | 4.3869E−03 | −2.4629E−03 | 8.4817E−04 | 3.5864E−05 |
| A16 = | −4.2493E−02 | | 7.0823E−04 | 7.2699E−04 | −5.0924E−05 | −1.3293E−06 |

In the optical imaging lens assembly according to the 2nd embodiment, the definitions of the following parameters are the same as those stated in the 1st embodiment with corresponding values for the 2nd embodiment. Moreover, these parameters can be calculated from Table 3 and Table 4 as the following values and satisfy the following relationships:

| f (mm) | 3.65 |
|---|---|
| Fno | 2.20 |
| HFOV (deg.) | 39.1 |
| V2 + V5 | 42.8 |
| CT3/CT6 | 0.51 |
| (T45 + SAG51)/CT5 | −1.50 |
| (R3 + R4)/(R3 − R4) | −0.87 |
| |(R5 − R6)/(R5 + R6)| + |(R9 − R10)/(R9 + R10)| | 0.12 |
| f/f5 | −0.23 |
| f6/f5 | 0.30 |
| SD/TD | 0.93 |
| ΣCT/TD | 0.70 |
| BFL/TTL | 0.18 |

3rd Embodiment

Figure 5:
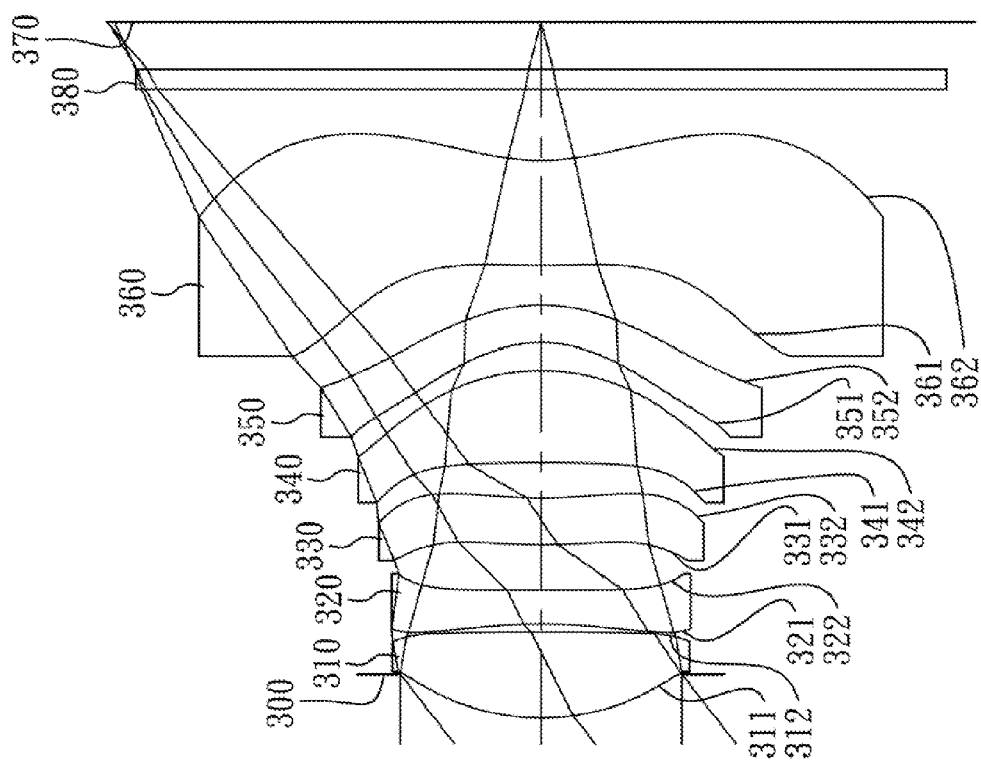
FIG. 5 is a schematic view of an optical imaging lens assembly according to the 3rd embodiment of the present disclosure.
Figure 6:
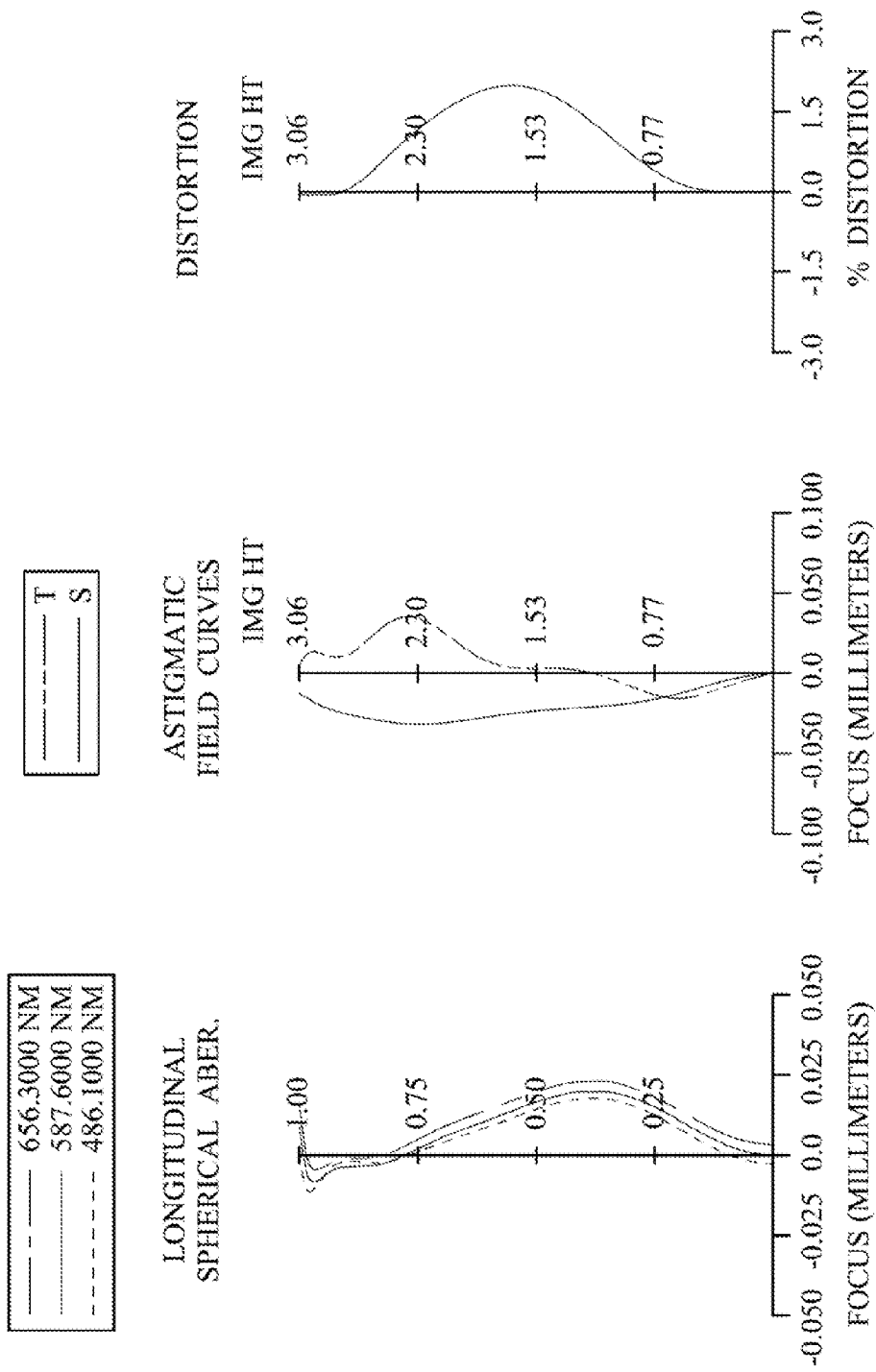
FIG. 6 shows spherical aberration curves, astigmatic field curves and a distortion curve of the optical imaging lens assembly according to the 3rd embodiment.

FIG. 5 is a schematic view of an optical imaging lens assembly according to the 3rd embodiment of the present disclosure. FIG. 6 shows spherical aberration curves, astigmatic field curves and a distortion curve of the optical imaging lens assembly according to the 3rd embodiment. In FIG. 5, the optical imaging lens assembly includes, in order from an object side to an image side, a stop, which is an aperture stop 300, followed by a first lens element 310, a second lens element 320, a third lens element 330, a fourth lens element 340, a fifth lens element 350, a sixth lens element 360, an IR-cut filter 380 and an image plane 370.

The first lens element 310 with positive refractive power has a convex object-side surface 311 and a convex image-side surface 312. The first lens element 310 is made of plastic material, and has the object-side surface 311 and the image-side surface 312 being both aspheric.

The second lens element 320 with negative refractive power has a concave object-side surface 321 and a convex image-side surface 322. The second lens element 320 is made of plastic material, and has the object-side surface 321 and the image-side surface 322 being both aspheric. Furthermore, the second lens element 320 has inflection points on the object-side surface 321 and the image-side surface 322 thereof.

The third lens element 330 with negative refractive power has a convex object-side surface 331 and a concave image-side surface 332, wherein the object-side surface 331 changes from convex at a paraxial region thereof to concave at a peripheral region thereof. The third lens element 330 is made of plastic material, and has the object-side surface 331 and the mage-side surface 332 being both aspheric.

The fourth lens element 340 with positive refractive power has a concave object-side surface 341 and a convex image-side surface 342. The fourth lens element 340 is made of plastic material, and has the object-side surface 341 and the image-side surface 342 being both aspheric.

The fifth lens element 350 with negative refractive power has a concave object-side surface 351 and a convex image-side surface 352. The fifth lens element 350 is made of plastic material, and has the object-side surface 351 and the image-side surface 352 being both aspheric.

The sixth lens element 360 with negative refractive power has a convex object-side surface 361 and a concave image-side surface 362. The sixth lens element 360 is made of plastic material, and has the object-side surface 361 and the image-side surface 362 being both aspheric. Furthermore, the sixth lens element 360 has at least one inflection point on the image-side surface 362 thereof.

The IR-cut filter 380 is made of glass material and located between the sixth lens element 360 and the image plane 370, and will not affect the focal length of the optical imaging lens assembly.

The detailed optical data of the 3rd embodiment are shown in Table 5 and the aspheric surface data are shown in Table 6 below.

TABLE 5

3rd Embodiment
f = 3.97 mm, Fno = 2.00, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.311 | | | | |
| 2 | Lens 1 | 1.616 | ASP | 0.608 | Plastic | 1.544 | 55.9 | 2.89 |
| 3 | | −52.389 | ASP | 0.057 | | | | |
| 4 | Lens 2 | −3.655 | ASP | 0.240 | Plastic | 1.634 | 23.8 | −6.11 |
| 5 | | −65.863 | ASP | 0.316 | | | | |
| 6 | Lens 3 | 4.034 | ASP | 0.335 | Plastic | 1.535 | 55.7 | −56.80 |
| 7 | | 3.458 | ASP | 0.248 | | | | |
| 8 | Lens 4 | −20.843 | ASP | 0.650 | Plastic | 1.544 | 55.9 | 3.12 |
| 9 | | −1.589 | ASP | 0.197 | | | | |
| 10 | Lens 5 | −0.939 | ASP | 0.267 | Plastic | 1.634 | 23.8 | −13.29 |
| 11 | | −1.173 | ASP | 0.281 | | | | |
| 12 | Lens 6 | 7.930 | ASP | 0.740 | Plastic | 1.535 | 55.7 | −3.74 |
| 13 | | 1.547 | ASP | 0.500 | | | | |
| 14 | IR-cut filter | Plano | | 0.145 | Glass | 1.517 | 64.2 | — |
| 15 | | Plano | | 0.334 | | | | |
| 16 | Image | Plano | | — | | | | |

Note:
Reference wavelength (d-line) is 587.6 nm.

TABLE 6

Aspheric Coefficients

| Surface # | 2 | 3 | 4 | 5 | 6 | 7 |
|---|---|---|---|---|---|---|
| k = | −1.9333E−02 | −1.0000E+00 | −1.8865E+01 | −2.0000E+01 | −3.7323E+00 | −5.3894E+00 |
| A4 = | −4.8609E−03 | −1.2614E−02 | 2.1919E−02 | 4.8333E−02 | −2.1270E−01 | −1.5572E−01 |
| A6 = | 3.3022E−02 | 3.4892E−02 | 7.9002E−02 | 3.3862E−02 | 1.4567E−02 | 2.2020E−02 |
| A8 = | −5.1321E−02 | −5.2552E−02 | −8.2728E−02 | 5.4998E−02 | 4.3537E−04 | −7.0339E−02 |
| A10 = | −5.6756E−03 | −3.1986E−02 | −2.3069E−02 | −1.7657E−01 | −6.7264E−03 | −3.6410E−04 |
| A12 = | 7.8733E−02 | 2.5038E−02 | 7.4589E−02 | 2.2075E−01 | 3.9137E−02 | 2.4575E−02 |
| A14 = | −6.8273E−02 | −9.3190E−04 | −1.2371E−02 | −6.3339E−02 | 1.6136E−02 | −6.7686E−03 |

| Surface # | 8 | 9 | 10 | 11 | 12 | 13 |
|---|---|---|---|---|---|---|
| k = | −1.0000E+00 | −4.0919E−01 | −1.3319E+00 | −1.3942E+00 | −7.3594E+00 | −7.5440E+00 |
| A4 = | −5.5366E−02 | −7.4569E−02 | 1.0540E−01 | 1.1310E−01 | −2.2345E−01 | −7.3170E−02 |
| A6 = | −3.4414E−02 | 3.5365E−02 | −1.3526E−01 | −7.8821E−02 | 7.7592E−02 | 2.5817E−02 |

TABLE 6-continued

| Aspheric Coefficients | | | | | | |
|---|---|---|---|---|---|---|
| A8 = | 2.1423E−02 | 1.1442E−02 | 1.5073E−01 | 2.4065E−02 | −4.1331E−02 | −9.3901E−03 |
| A10 = | −5.3391E−02 | 1.7502E−03 | −5.1895E−02 | 9.9050E−03 | 2.1391E−02 | 2.3767E−03 |
| A12 = | −4.8617E−02 | −1.1958E−02 | −6.5637E−03 | −2.5925E−03 | −5.7446E−03 | −3.8408E−04 |
| A14 = | 7.8295E−02 | −9.8510E−05 | 5.0519E−03 | −2.4647E−03 | 8.2618E−04 | 3.3630E−05 |
| A16 = | −2.1983E−02 | 2.9053E−03 | −6.9434E−04 | 7.1244E−04 | −5.5299E−05 | −1.1577E−06 |

In the optical imaging lens assembly according to the 3rd embodiment, the definitions of the following parameters are the same as those stated in the 1st embodiment with corresponding values for the 3rd embodiment. Moreover, these parameters can be calculated from Table 5 and Table 6 as the following values and satisfy the following relationships:

| | |
|---|---|
| f (mm) | 3.97 |
| Fno | 2.00 |
| HFOV (deg.) | 37.6 |
| V2 + V5 | 47.6 |
| CT3/CT6 | 0.45 |
| (T45 + SAG51)/CT5 | −1.77 |
| (R3 + R4)/(R3 − R4) | −1.12 |
| |(R5 − R6)/(R5 + R6)| + |(R9 − R10)/(R9 + R10)| | 0.19 |
| f/f5 | −0.30 |
| f6/f5 | 0.28 |
| SD/TD | 0.92 |
| ΣCT/TD | 0.72 |
| BFL/TTL | 0.19 |

4th Embodiment

Figure 7:
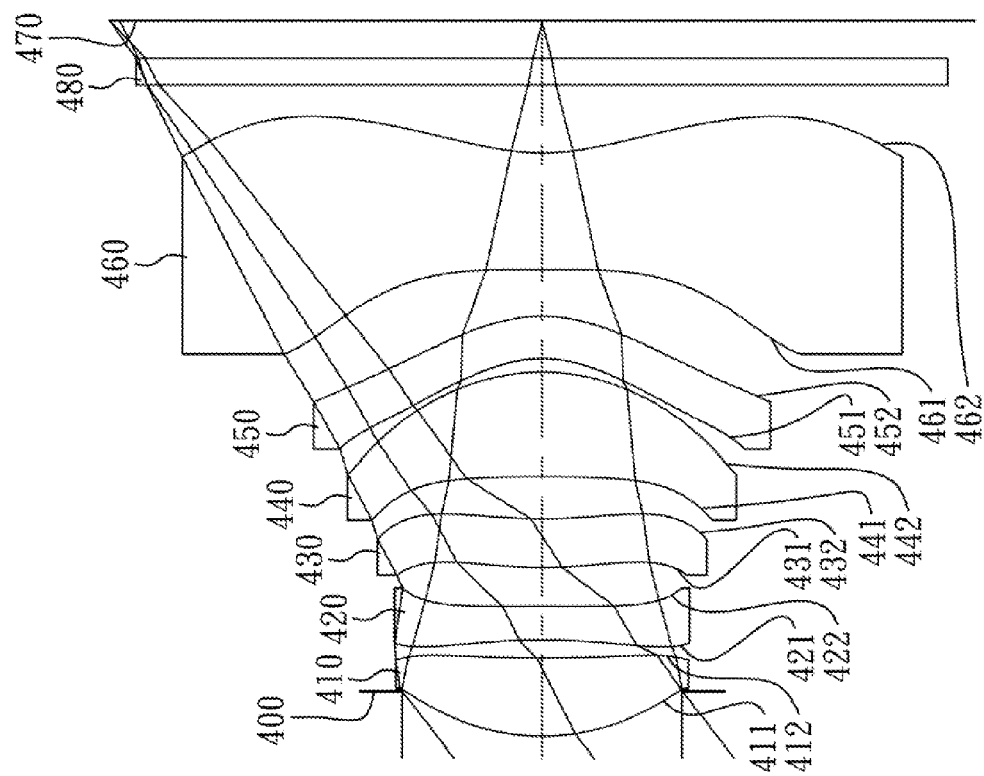
FIG. 7 is a schematic view of an optical imaging lens assembly according to the 4th embodiment of the present disclosure.
Figure 8:
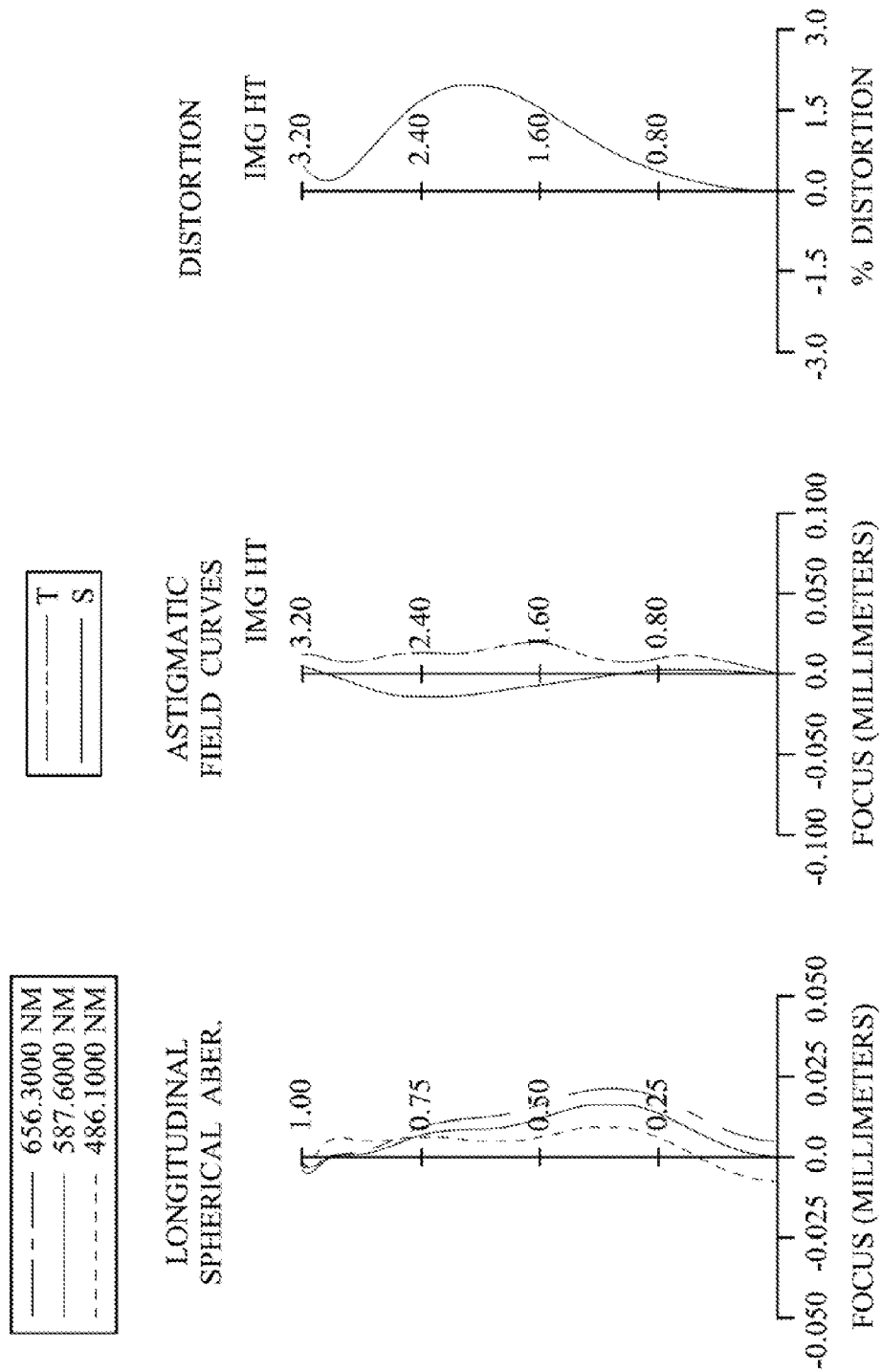
FIG. 8 shows spherical aberration curves, astigmatic field curves and a distortion curve of the optical imaging lens assembly according to the 4th embodiment.

FIG. 7 is a schematic view of an optical imaging lens assembly according to the 4th embodiment of the present disclosure. FIG. 8 shows spherical aberration curves, astigmatic field curves and a distortion curve of the optical imaging lens assembly according to the 4th embodiment. In FIG. 7, the optical imaging lens assembly includes, in order from an object side to an image side, a stop, which is an aperture stop 400, followed by a first lens element 410, a second lens element 420, a third lens element 430, a fourth lens element 440, a fifth lens element 450, a sixth lens element 460, an IR-cut filter 480 and an image plane 470.

The first lens element 410 with positive refractive power has a convex object-side surface 411 and a concave image-side surface 412. The first lens element 410 is made of plastic material, and has the object-side surface 411 and the image-side surface 412 being both aspheric.

The second lens element 420 with negative refractive power has a concave object-side surface 421 and a convex image-side surface 422. The second lens element 420 is made of plastic material, and has the object-side surface 421 and the image-side surface 422 being both aspheric. Furthermore, the second lens element 420 has inflection points on the object-side surface 421 and the image-side surface 422 thereof.

The third lens element 430 with positive refractive power has a convex object-side surface 431 and a concave image-side surface 432, wherein the object-side surface 431 changes from convex at a paraxial region thereof to concave at a peripheral region thereof. The third lens element 430 is made of plastic material, and has the object-side surface 431 and the image-side surface 432 being both aspheric.

The fourth lens element 440 with positive refractive power has a concave object-side surface 441 and a convex image-side surface 442. The fourth lens element 440 is made of plastic material, and has the object-side surface 441 and the image-side surface 442 being both aspheric.

The fifth lens element 450 with negative refractive power has a concave object-side surface 451 and a convex image-side surface 452. The fifth lens element 450 is made of plastic material, and has the object-side surface 451 and the image-side surface 452 being both aspheric.

The sixth lens element 460 with negative refractive power has a concave object-side surface 461 and a concave image-side surface 462. The sixth lens element 460 is made of plastic material, and has the object-side surface 461 and the image-side surface 462 being both aspheric. Furthermore, the sixth lens element 460 has at least one inflection point on the image-side surface 462 thereof.

The IR-cut filter 480 is made of glass material and located between the sixth lens element 460 and the image plane 470, and will not affect the focal length of the optical imaging lens assembly.

The detailed optical data of the 4th embodiment are shown in Table 7 and the aspheric surface data are shown in Table 8 below.

TABLE 7

4th Embodiment
f = 4.14 mm, Fno = 2.00, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.338 | | | | |
| 2 | Lens 1 | 1.652 | ASP | 0.582 | Plastic | 1.544 | 55.9 | 3.58 |
| 3 | | 9.473 | ASP | 0.134 | | | | |
| 4 | Lens 2 | −4.595 | ASP | 0.250 | Plastic | 1.640 | 23.3 | −7.54 |
| 5 | | −100.000 | ASP | 0.283 | | | | |
| 6 | Lens 3 | 3.274 | ASP | 0.365 | Plastic | 1.535 | 55.7 | 29.58 |
| 7 | | 3.967 | ASP | 0.311 | | | | |
| 8 | Lens 4 | −15.837 | ASP | 0.775 | Plastic | 1.544 | 55.9 | 2.98 |
| 9 | | −1.495 | ASP | 0.100 | | | | |
| 10 | Lens 5 | −0.919 | ASP | 0.310 | Plastic | 1.640 | 23.3 | −26.57 |
| 11 | | −1.099 | ASP | 0.348 | | | | |

TABLE 7-continued

4th Embodiment
f = 4.14 mm, Fno = 2.00, HFOV = 37.5 deg.

| Surface # | | Curvature Radius | | Thickness | Material | Index | Abbe # | Focal Length |
|---|---|---|---|---|---|---|---|---|
| 12 | Lens 6 | −81.037 | ASP | 0.864 | Plastic | 1.535 | 55.7 | −2.99 |
| 13 | | 1.636 | ASP | 0.500 | | | | |
| 14 | IR-cut filter | Plano | | 0.200 | Glass | 1.517 | 64.2 | — |
| 15 | | Plano | | 0.281 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | 1.5309E−01 | −1.0000E+00 | −7.3151E+00 | 3.0000E+00 | −2.0000E+01 | 8.5448E−01 |
| A4 = | −4.2775E−03 | −2.6696E−02 | 1.4295E−02 | 1.8706E−02 | −9.5698E−02 | −1.1250E−01 |
| A6 = | 1.8209E−02 | −1.6805E−03 | 7.9031E−02 | 1.1065E−01 | 5.1539E−03 | 2.5204E−04 |
| A8 = | −3.2768E−02 | 2.3401E−03 | −5.6588E−02 | −1.5591E−02 | −4.7372E−02 | −2.3921E−02 |
| A10 = | −3.3257E−03 | −2.2775E−02 | 1.8676E−02 | −7.6547E−02 | 2.9776E−02 | 2.1476E−03 |
| A12 = | 4.1431E−02 | −3.8259E−03 | 1.1313E−02 | 9.2710E−02 | −2.3090E−02 | −1.1293E−03 |
| A14 = | −3.4201E−02 | 5.5021E−03 | 6.2382E−03 | −1.7416E−02 | 5.2965E−03 | 5.3970E−04 |

| Surface # | 8 | 9 | 10 | 11 | 12 | 13 |
|---|---|---|---|---|---|---|
| k = | −1.0000E+00 | −5.3384E+00 | −1.8788E+00 | −1.9818E+00 | −2.0000E+01 | −7.7416E+00 |
| A4 = | −4.5807E−02 | −1.1181E−01 | 1.6537E−01 | 1.1489E−01 | −1.2342E−01 | −4.6340E−02 |
| A6 = | −4.4139E−02 | 1.8060E−02 | −1.6568E−01 | −6.2692E−02 | 4.7176E−02 | 1.8239E−02 |
| A8 = | 3.0636E−02 | 4.1047E−03 | 9.9757E−02 | 8.6971E−03 | −2.6687E−02 | −6.1796E−03 |
| A10 = | −2.0473E−02 | −9.4463E−04 | −2.2420E−02 | 5.9068E−03 | 1.1912E−02 | 1.3706E−03 |
| A12 = | −2.9306E−02 | −3.2449E−04 | −3.3583E−03 | −5.7602E−04 | −2.8452E−03 | −1.8769E−04 |
| A14 = | 3.1706E−02 | 7.9321E−04 | 1.9039E−03 | −9.2170E−04 | 3.6197E−04 | 1.3837E−05 |
| A16 = | −7.5426E−03 | 2.0537E−04 | −2.2274E−04 | 1.9183E−04 | −1.9971E−05 | −4.0281E−07 |

In the optical imaging lens assembly according to the 4th embodiment, the definitions of the following parameters are the same as those stated in the 1st embodiment with corresponding values for the 4th embodiment. Moreover, these parameters can be calculated from Table 7 and Table 8 as the following values and satisfy the following relationships:

| | |
|---|---|
| f (mm) | 4.14 |
| Fno | 2.00 |
| HFOV (deg.) | 37.5 |
| V2 + V5 | 46.6 |
| CT3/CT6 | 0.42 |
| (T45 + SAG51)/CT5 | −1.85 |
| (R3 + R4)/(R3 − R4) | −1.10 |
| \|(R5 − R6)/(R5 + R6)\| + \|(R9 − R10)/(R9 + R10)\| | 0.19 |
| f/f5 | −0.16 |
| f6/f5 | 0.11 |
| SD/TD | 0.92 |
| ΣCT/TD | 0.73 |
| BFL/TTL | 0.17 |

5th Embodiment

Figure 9:
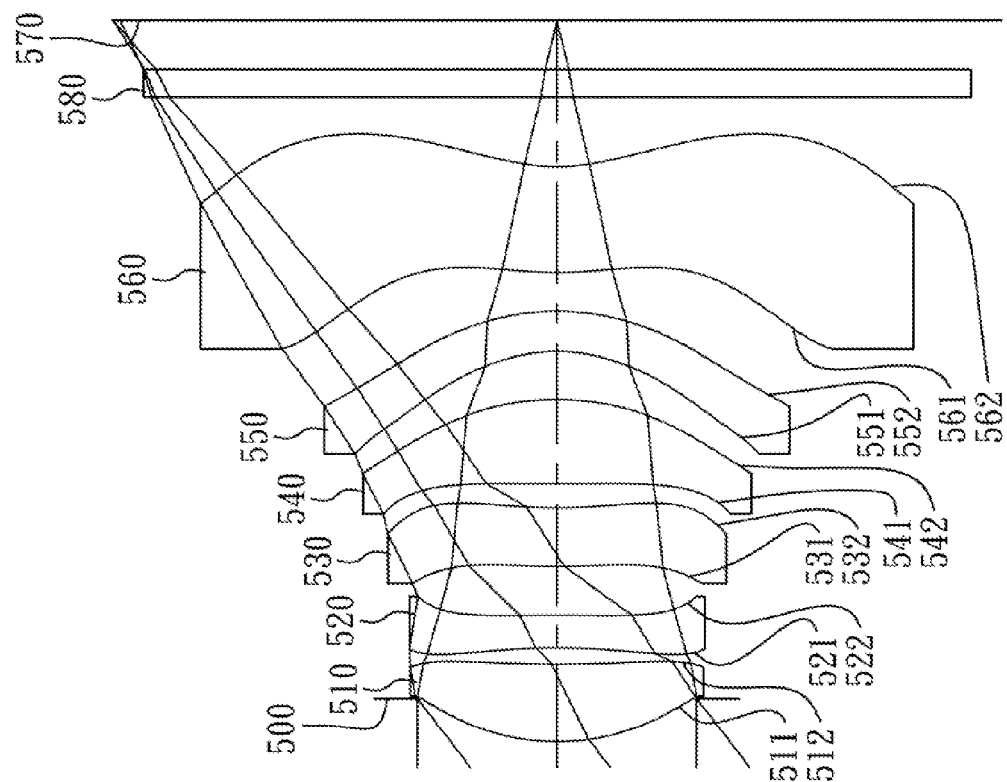
FIG. 9 is a schematic view of an optical imaging lens assembly according to the 5th embodiment of the present disclosure.
Figure 10:
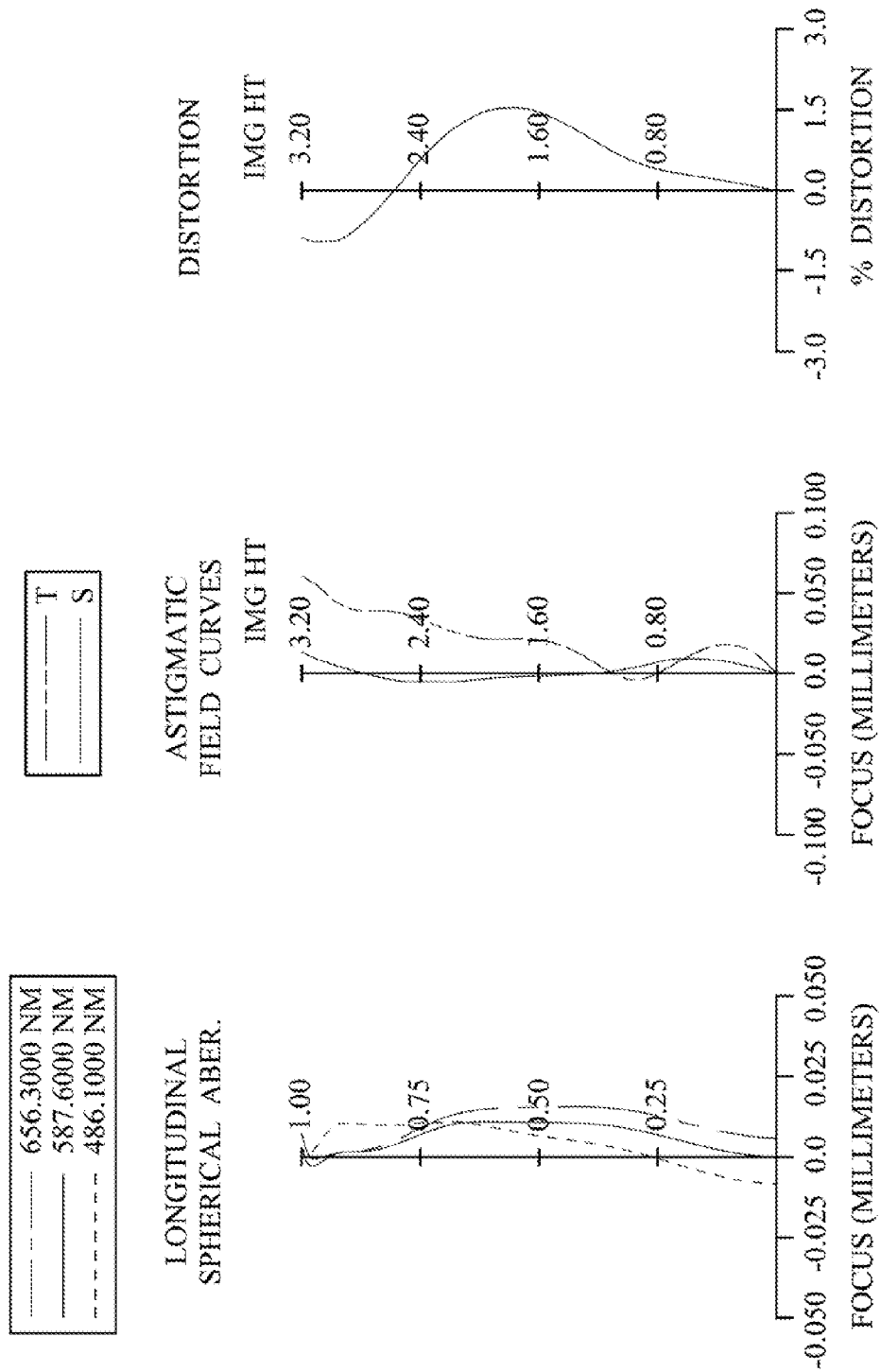
FIG. 10 shows spherical aberration curves, astigmatic field curves and a distortion curve of the optical imaging lens assembly according to the 5th embodiment.

FIG. 9 is a schematic view of an optical imaging lens assembly according to the 5th embodiment of the present disclosure. FIG. 10 shows spherical aberration curves, astigmatic field curves and a distortion curve of the optical imaging lens assembly according to the 5th embodiment. In FIG. 9, the optical imaging lens assembly includes, in order from an object side to an image side, a stop, which is an aperture stop 500, followed by a first lens element 510, a second lens element 520, a third lens element 530, a fourth lens element 540, a fifth lens element 550, a sixth lens element 560, an IR-cut filter 580 and an image plane 570.

The first lens element 510 with positive refractive power has a convex object-side surface 511 and a concave image-side surface 512. The first lens element 510 is made of plastic material, and has the object-side surface 511 and the image-side surface 512 being both aspheric.

The second lens element 520 with negative refractive power has a concave object-side surface 521 and a convex image-side surface 522. The second lens element 520 is made of plastic material, and has the object-side surface 521 and the image-side surface 522 being both aspheric. Furthermore, the second lens element 520 has inflection points on the object-side surface 521 and the image-side surface 522 thereof.

The third lens element 530 with negative refractive power has convex object-side surface 531 and a concave image-side surface 532, wherein the object-side surface 531 changes from convex at a paraxial region thereof to concave at a peripheral region thereof. The third lens element 530 is made of plastic material, and has the object-side surface 531 and the image-side surface 532 being both aspheric.

The fourth lens element 540 with positive refractive power has a convex object-side surface 541 and a convex image-side surface 542. The fourth lens element 540 is made of plastic material, and has the object-side surface 541 and the image-side surface 542 being both aspheric.

The fifth lens element 550 with negative refractive power has a concave object-side surface 551 and a convex image-side surface 552. The fifth lens element 550 is made of plastic material, and has the object-side surface 551 and the image-side surface 552 being both aspheric.

The sixth lens element 560 with negative refractive power has a convex object-side surface 561 and a concave image-side surface 562. The sixth lens element 560 is made of plastic material, and has the object-side surface 561 and the image-side surface 562 being both aspheric. Furthermore, the sixth lens element 560 has at least one inflection point on the image-side surface 562 thereof.

The IR-cut filter 580 is made of glass material and located between the sixth lens element 560 and the image plane 570, and will not affect the focal length of the optical imaging lens assembly.

The detailed optical data of the 5th embodiment are shown in Table 9 and the aspheric surface data are shown in Table 10 below.

In the optical imaging lens assembly according to the 5th embodiment, the definitions of the following parameters are the same as those stated in the 1st embodiment with corresponding values for the 5th embodiment. Moreover, these parameters can be calculated from Table 9 and Table 10 as the following values and satisfy the following relationships:

| | |
|---|---|
| f (mm) | 4.23 |
| Fno | 2.10 |
| HFOV (deg.) | 37.3 |
| V2 + V5 | 46.6 |
| CT3/CT6 | 0.56 |
| (T45 + SAG51)/CT5 | −1.36 |
| (R3 + R4)/(R3 − R4) | −1.42 |
| \|(R5 − R6)/(R5 + R6)\| + \|(R9 − R10)/(R9 + R10)\| | 0.46 |
| f/f5 | −0.47 |
| f6/f5 | 0.79 |
| SD/TD | 0.92 |
| ΣCT/TD | 0.69 |
| BFL/TTL | 0.19 |

TABLE 9

5th Embodiment
f = 4.23 mm, Fno = 2.10, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.315 | | | | |
| 2 | Lens 1 | 1.631 | ASP | 0.550 | Plastic | 1.530 | 57.0 | 3.47 |
| 3 | | 7.555 | ASP | 0.119 | | | | |
| 4 | Lens 2 | −4.734 | ASP | 0.235 | Plastic | 1.640 | 23.3 | −8.99 |
| 5 | | −27.275 | ASP | 0.350 | | | | |
| 6 | Lens 3 | 6.253 | ASP | 0.425 | Plastic | 1.544 | 55.9 | −14.49 |
| 7 | | 3.404 | ASP | 0.174 | | | | |
| 8 | Lens 4 | 28.986 | ASP | 0.605 | Plastic | 1.544 | 55.9 | 3.58 |
| 9 | | −2.072 | ASP | 0.345 | | | | |
| 10 | Lens 5 | −1.236 | ASP | 0.290 | Plastic | 1.640 | 23.3 | −9.08 |
| 11 | | −1.714 | ASP | 0.282 | | | | |
| 12 | Lens 6 | 2.514 | ASP | 0.763 | Plastic | 1.544 | 55.9 | −7.14 |
| 13 | | 1.363 | ASP | 0.500 | | | | |
| 14 | IR-cut filter | Plano | | 0.200 | Glass | 1.517 | 64.2 | — |
| 15 | | Plano | | 0.356 | | | | |
| 16 | Image | Plano | | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | 1.3022E−01 | −2.3606E+01 | −1.6530E+01 | −1.0000E+00 | −3.0000E+01 | −2.9706E+01 |
| A4 = | −4.2801E−03 | −3.8671E−02 | −8.4840E−03 | 3.6973E−02 | −1.7238E−01 | −9.3960E−02 |
| A6 = | 1.6684E−02 | 1.2794E−02 | 1.0777E−01 | 1.1606E−01 | 2.8040E−02 | 7.9929E−03 |
| A8 = | −3.2769E−02 | −3.4023E−02 | −4.6477E−02 | 8.6196E−03 | −5.3739E−04 | −4.2738E−02 |
| A10 = | −3.3263E−03 | −8.7027E−03 | −6.0943E−02 | −1.1180E−01 | −4.9408E−02 | −2.5200E−03 |
| A12 = | 4.0243E−02 | 1.0836E−02 | 8.5795E−02 | 1.3406E−01 | 1.8079E−02 | 8.7193E−03 |
| A14 = | −4.0903E−02 | −4.5162E−03 | −1.8368E−02 | −3.2390E−02 | 8.1747E−03 | −9.2967E−04 |

| Surface # | 8 | 9 | 10 | 11 | 12 | 13 |
|---|---|---|---|---|---|---|
| k = | 0.0000E+00 | −1.5822E+00 | −3.1771E+00 | −5.4097E−01 | −3.0000E+01 | −7.4400E+00 |
| A4 = | −7.5890E−02 | −7.9536E−02 | −3.6667E−02 | 3.1438E−02 | −1.5803E−01 | −5.8070E−02 |
| A6 = | 2.5852E−02 | 1.7324E−02 | −1.1858E−01 | −3.3374E−02 | 5.3459E−02 | 1.8118E−02 |
| A8 = | −2.6295E−02 | 4.2146E−03 | 1.2417E−01 | 1.3016E−02 | −2.6307E−02 | −5.7862E−03 |
| A10 = | −3.4392E−02 | 9.1682E−03 | −2.9043E−02 | 5.7159E−03 | 1.1762E−02 | 1.2948E−03 |
| A12 = | −1.3573E−02 | −3.3215E−03 | −5.6528E−03 | −1.2335E−03 | −2.8775E−03 | −1.8894E−04 |
| A14 = | 3.8221E−02 | −1.1727E−03 | 1.9176E−03 | −1.6081E−03 | 3.6789E−04 | 1.5302E−05 |
| A16 = | −1.3884E−02 | 3.4600E−04 | 1.2021E−05 | 2.6201E−04 | −1.9816E−05 | −4.8301E−07 |

6th Embodiment

Figure 11:
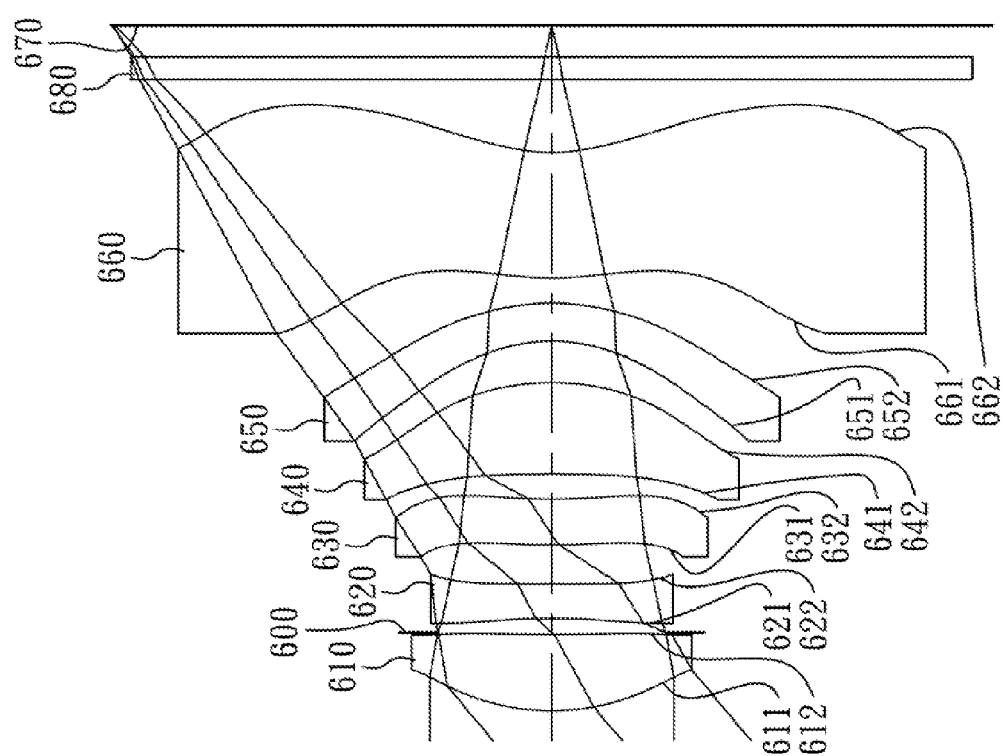
FIG. 11 is a schematic view of an optical imaging lens assembly according to the 6th embodiment of the present disclosure.
Figure 12:
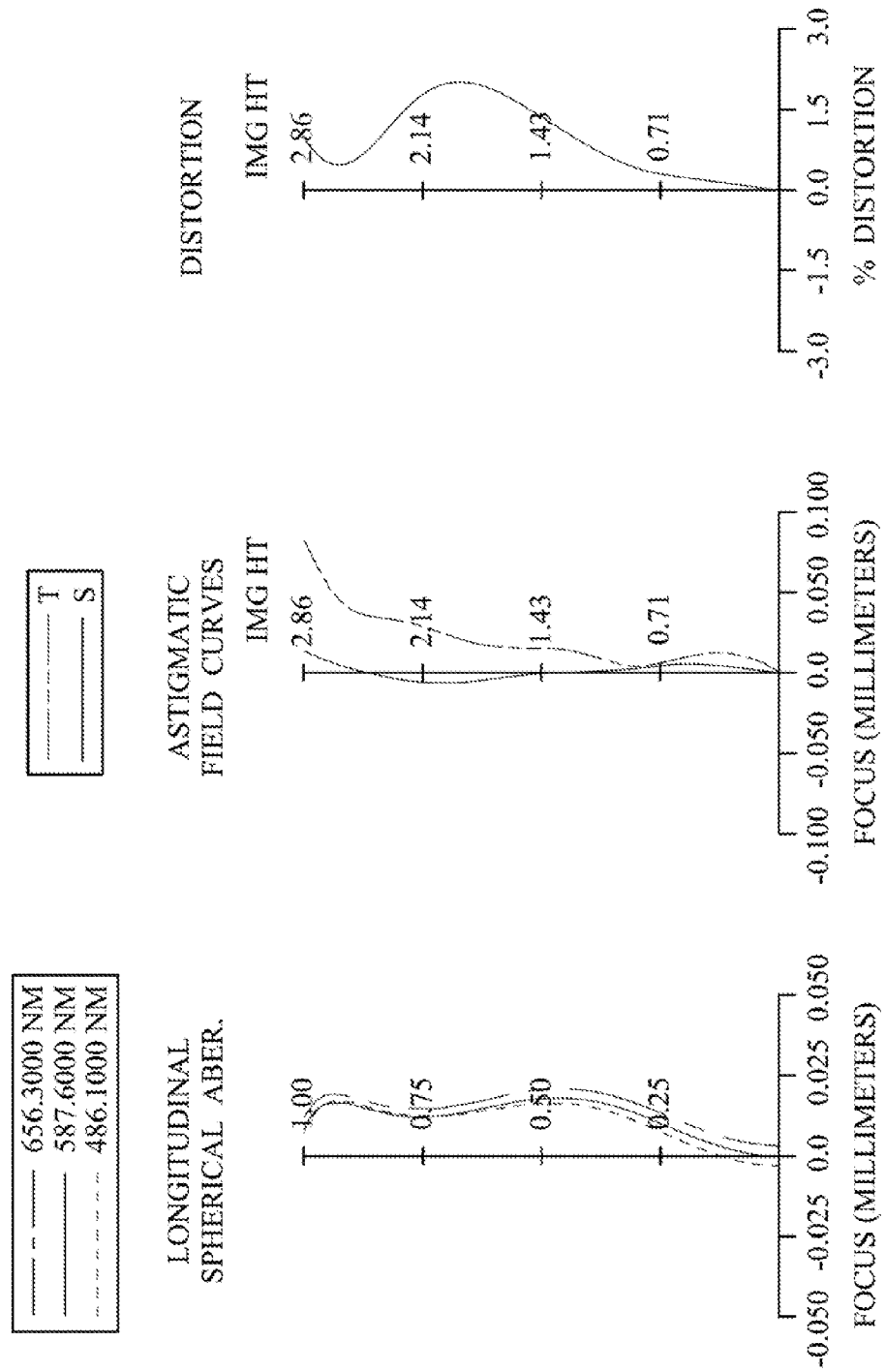
FIG. 12 shows spherical aberration curves, astigmatic field curves and a distortion curve of the optical imaging lens assembly according to the 6th embodiment.

FIG. 11 is a schematic view of an optical imaging lens assembly according to the 6th embodiment of the present disclosure. FIG. 12 shows spherical aberration curves, astigmatic field curves and a distortion curve of the optical imaging lens assembly according to the 6th embodiment. In FIG. 11, the optical imaging lens assembly includes, in order from an object side to an image side, a first lens element 610, a stop, which is an aperture stop 600, a second lens element 620, a third lens element 630, a fourth lens element 640, a fifth lens element 650, a sixth lens element 660, an IR-cut filter 680 and an image plane 670.

The first lens element 610 with positive refractive power has a convex object-side surface 611 and a concave image-side surface 612. The first lens element 610 is made of plastic material, and has the object-side surface 611 and the image-side surface 612 being both aspheric.

The second lens element 620 with negative refractive power has a concave object-side surface 621 and a planar image-side surface 622. The second lens element 620 is made of plastic material, and has the object-side surface 621 and the image-side surface 622 being both aspheric. Furthermore, the second lens element 620 has at least one inflection point on the object-side surface 621 thereof.

The third lens element 630 with negative refractive power has a convex object-side surface 631 and a concave image-side surface 632, wherein the object-side surface 631 changes from convex at a paraxial region thereof to concave at a peripheral region thereof. The third lens element 630 is made of plastic material, and has the object-side surface 631 and the image-side surface 632 being both aspheric.

The fourth lens element 640 with positive refractive power has a concave object-side surface 641 and a convex image-side surface 642. The fourth lens element 640 is made of plastic material, and has the object-side surface 641 and the image-side surface 642 being both aspheric.

The fifth lens element 650 with negative refractive power has a concave object-side surface 651 and a convex image-side surface 652. The fifth lens element 650 is made of plastic material, and has the object-side surface 651 and the image-side surface 652 being both aspheric.

The sixth lens element 660 with negative refractive power has a convex object-side surface 661 and a concave image-side surface 662. The sixth lens element 660 is made of plastic material, and has the object-side surface 661 and the image-side surface 662 being both aspheric. Furthermore, the sixth lens element 660 has at least one inflection point on the image-side surface 662 thereof.

The IR-cut filter 680 is made of glass material and located between the sixth lens element 660 and the image plane 670, and will not affect the focal length of the optical imaging lens assembly.

The detailed optical data of the 6th embodiment are shown in Table 11 and the aspheric surface data are shown in Table 12 below.

TABLE 11

6th Embodiment
f = 3.40 mm, Fno = 2.15, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.473 | ASP | 0.496 | Plastic | 1.570 | 57.0 | 2.89 |
| 2 | | 12.023 | ASP | 0.014 | | | | |
| 3 | Ape. Stop | Plano | | 0.091 | | | | |
| 4 | Lens 2 | −4.202 | ASP | 0.220 | Plastic | 1.640 | 23.3 | −6.57 |
| 5 | | ∞ | ASP | 0.256 | | | | |
| 6 | Lens 3 | 4.056 | ASP | 0.298 | Plastic | 1.544 | 55.9 | −56.24 |
| 7 | | 3.489 | ASP | 0.162 | | | | |
| 8 | Lens 4 | −13.804 | ASP | 0.594 | Plastic | 1.544 | 55.9 | 3.61 |
| 9 | | −1.748 | ASP | 0.267 | | | | |
| 10 | Lens 5 | −1.070 | ASP | 0.250 | Plastic | 1.640 | 23.3 | −7.81 |
| 11 | | −1.485 | ASP | 0.163 | | | | |
| 12 | Lens 6 | 2.000 | ASP | 0.814 | Plastic | 1.535 | 55.7 | −7.78 |
| 13 | | 1.159 | ASP | 0.476 | | | | |
| 14 | IR-cut filter | Plano | | 0.145 | Glass | 1.517 | 64.2 | — |
| 15 | | Plano | | 0.205 | | | | |
| 16 | Image | Plano | | — | | | | |

Note:
Reference wavelength (d-line) is 587.6 nm.

TABLE 12

Aspheric Coefficients

| Surface # | 1 | 2 | 4 | 5 | 6 | 7 |
|---|---|---|---|---|---|---|
| k = | 5.6752E−02 | −7.1978E+00 | −2.0000E+01 | 0.0000E+00 | −2.0000E+01 | −1.4099E+01 |
| A4 = | −1.3891E−02 | −6.4029E−02 | 1.5450E−02 | 6.3590E−02 | −2.5836E−01 | −1.9789E−01 |
| A6 = | 2.9066E−02 | 1.7833E−02 | 2.2601E−01 | 2.3489E−01 | 1.7883E−02 | 3.8731E−02 |
| A8 = | −8.1949E−02 | −3.1141E−02 | −1.7647E−01 | −5.8441E−02 | −2.9011E−02 | −1.0620E−01 |
| A10 = | −4.5365E−02 | −7.2141E−02 | −1.0925E−01 | −2.8601E−01 | −1.0404E−01 | 1.3705E−02 |
| A12 = | 1.4290E−01 | 1.6430E−02 | 2.5649E−01 | 4.0457E−01 | 2.3414E−02 | 2.1112E−02 |
| A14 = | −1.7076E−01 | −9.5163E−03 | −5.6420E−02 | −8.6851E−02 | 1.1755E−09 | 1.1989E−09 |

TABLE 12-continued

Aspheric Coefficients

| Surface # | 8 | 9 | 10 | 11 | 12 | 13 |
|---|---|---|---|---|---|---|
| k = | −1.0000E+00 | 7.5899E−01 | −4.1240E+00 | −5.7572E−01 | −2.0000E+01 | −5.4494E+00 |
| A4 = | −9.3459E−02 | −1.0648E−01 | −1.0996E−01 | 6.7796E−02 | −2.0344E−01 | −7.5563E−02 |
| A6 = | −2.6896E−03 | 3.9869E−02 | −1.6808E−01 | −6.8635E−02 | 9.3386E−02 | 3.3643E−02 |
| A8 = | 2.6045E−02 | 1.9864E−02 | 2.7280E−01 | 2.9036E−02 | −5.8985E−02 | −1.2918E−02 |
| A10 = | −6.3898E−02 | 3.6402E−02 | −8.6053E−02 | 1.5761E−02 | 3.2721E−02 | 3.5739E−03 |
| A12 = | −3.9897E−02 | −8.4106E−03 | −2.1499E−02 | −4.4981E−03 | −1.0060E−02 | −6.5950E−04 |
| A14 = | 1.7528E−01 | −5.2230E−03 | 8.5553E−03 | −4.6778E−03 | 1.6064E−03 | 6.7368E−05 |
| A16 = | −9.3055E−02 | 1.2247E−03 | 6.8936E−04 | 1.4845E−03 | −1.0665E−04 | −2.7394E−06 |

In the optical imaging lens assembly according to the 6th embodiment, the definitions of the following parameters are the same as those stated in the 1st embodiment with corresponding values for the 6th embodiment. Moreover, these parameters can be calculated from Table 11 and Table 12 as the following values and satisfy the following relationships:

| | |
|---|---|
| f (mm) | 3.40 |
| Fno | 2.15 |
| HFOV (deg.) | 39.6 |
| V2 + V5 | 46.6 |
| CT3/CT6 | 0.37 |
| (T45 + SAG51)/CT5 | −1.54 |
| (R3 + R4)/(R3 − R4) | −1.00 |
| \|(R5 − R6)/(R5 + R6)\| + \|(R9 − R10)/(R9 + R10)\| | 0.24 |
| f/f5 | −0.44 |
| f6/f5 | 1.00 |
| SD/TD | 0.86 |
| ΣCT/TD | 0.74 |
| BFL/TTL | 0.18 |

7th Embodiment

Figure 13:
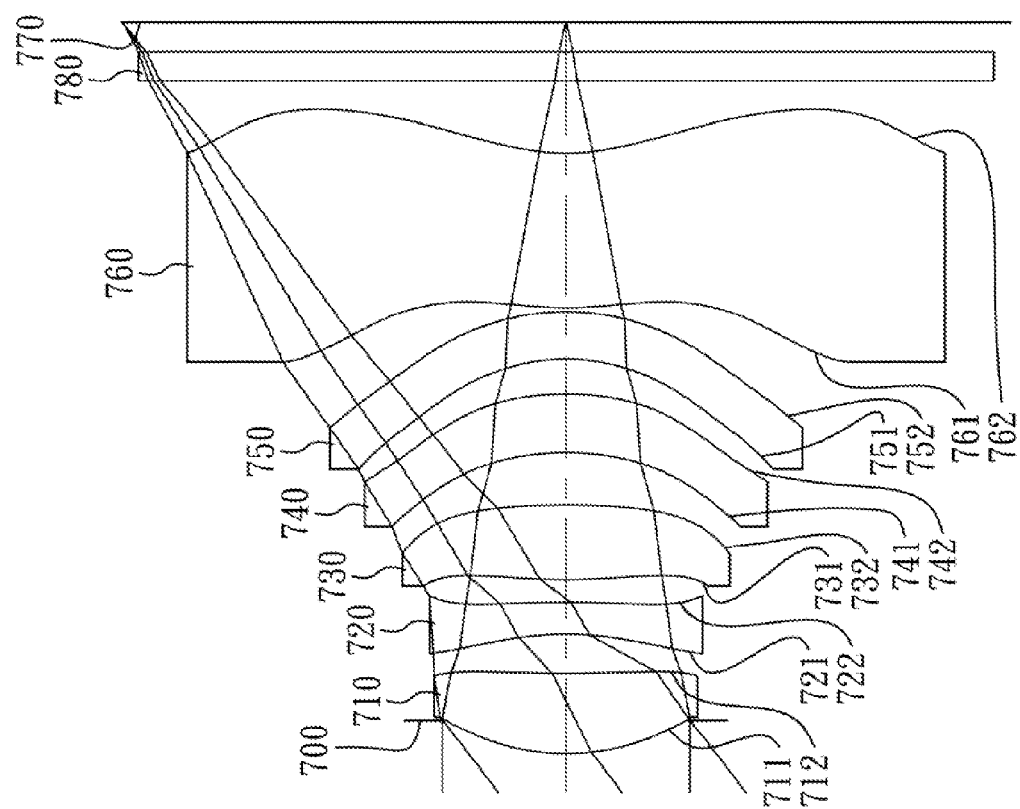
FIG. 13 is a schematic view of an optical imaging lens assembly according to the 7th embodiment of the present disclosure.
Figure 14:
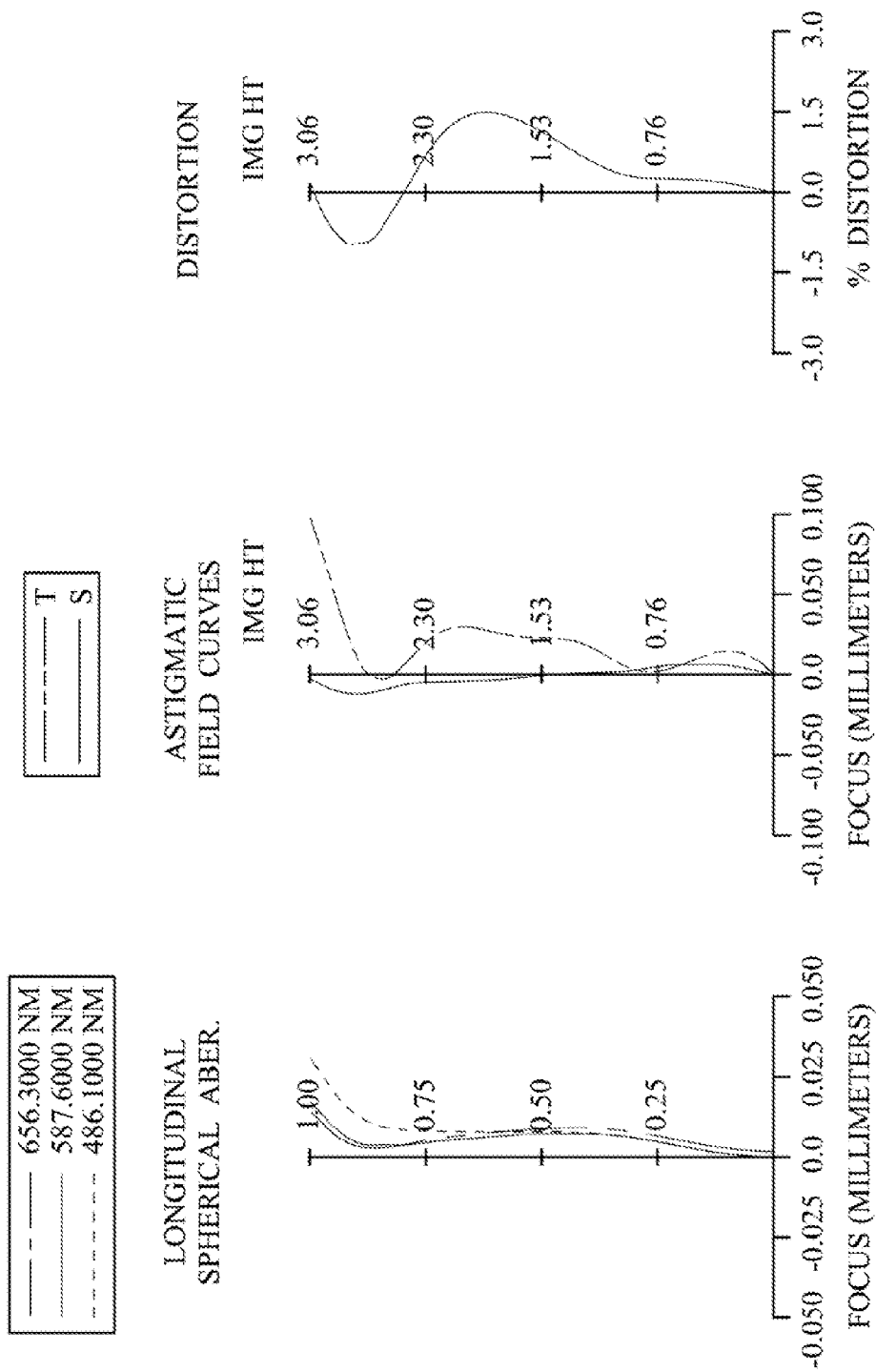
FIG. 14 shows spherical aberration curves, astigmatic field curves and a distortion curve of the optical imaging lens assembly according to the 7th embodiment.

FIG. 13 is a schematic view of an optical imaging lens assembly according to the 7th embodiment of the present disclosure. FIG. 14 shows spherical aberration curves, astigmatic field curves and a distortion curve of the optical imaging lens assembly according to the 7th embodiment. In FIG. 13, the optical imaging lens assembly includes, in order from an object side to an image side, a stop, which is an aperture stop 700, followed by a first lens element 710, a second lens element 720, a third lens element 730, a fourth lens element 740, a fifth lens element 750, a sixth lens element 760, an IR-cut filter 780 and an image plane 770.

The first lens element 710 with positive refractive power has a convex object-side surface 711 and a concave image-side surface 712. The first lens element 710 is made of plastic material, and has the object-side surface 711 and the image-side surface 712 being both aspheric.

The second lens element 720 with negative refractive power has a concave object-side surface 721 and a convex image-side surface 722. The second lens element 720 is made of plastic material, and has the object-side surface 721 and the image-side surface 722 being both aspheric. Furthermore, the second lens element 720 has inflection points on the object-side surface 721 and the image-side surface 722 thereof.

The third lens element 730 with positive refractive power has a convex object-side surface 731 and a convex image-side surface 732, wherein the object-side surface 731 changes from convex at a paraxial region thereof to concave at a peripheral region thereof. The third lens element 730 is made of plastic material, and has the object-side surface 731 and the age-side surface 732 being both aspheric.

The fourth lens element 740 with negative refractive power has a concave object-side surface 741 and a convex image-side surface 742. The fourth lens element 740 is made of plastic material, and has the object-side surface 741 and the image-side surface 742 being both aspheric.

The fifth lens element 750 with negative refractive power has a concave object-side surface 751 and a convex mage-side surface 752. The fifth lens element 750 is made of plastic material, and has the object-side surface 751 and the image-side surface 752 being both aspheric.

The sixth lens element 760 with negative refractive power has a convex object-side surface 761 and a concave image-side surface 762. The sixth lens element 760 is made of plastic material, and has the object-side surface 761 and the image-side surface 762 being both aspheric. Furthermore, the sixth lens element 760 has at least one inflection point on the image-side surface 762 thereof.

The IR-cut filter 780 is made of glass material and located between the sixth lens element 760 and the image plane 770, and will not affect the focal length of the optical imaging lens assembly.

The detailed optical data of the 7th embodiment are shown in Table 13 and the aspheric surface data are shown in Table 14 below.

TABLE 13

7th Embodiment
f = 3.93 mm, Fno = 2.30, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.234 | | | | |
| 2 | Lens 1 | 1.559 | ASP | 0.558 | Plastic | 1.544 | 55.9 | 3.29 |
| 3 | | 10.488 | ASP | 0.269 | | | | |
| 4 | Lens 2 | −2.157 | ASP | 0.220 | Plastic | 1.640 | 23.3 | −4.76 |
| 5 | | −7.685 | ASP | 0.153 | | | | |
| 6 | Lens 3 | 3.931 | ASP | 0.520 | Plastic | 1.544 | 55.9 | 4.18 |

TABLE 13-continued

7th Embodiment
f = 3.93 mm, Fno = 2.30, HFOV = 37.8 deg.

| Surface # | | Curvature Radius | Thickness | Material | Index | Abbe # | Focal Length |
|---|---|---|---|---|---|---|---|
| 7 | | −5.153 | ASP | 0.356 | | | |
| 8 | Lens 4 | −1.938 | ASP | 0.408 | Plastic | 1.544 | 55.9 | −135.98 |
| 9 | | −2.138 | ASP | 0.242 | | | |
| 10 | Lens 5 | −1.287 | ASP | 0.324 | Plastic | 1.632 | 23.4 | −16.02 |
| 11 | | −1.619 | ASP | 0.030 | | | |
| 12 | Lens 6 | 2.416 | ASP | 1.065 | Plastic | 1.544 | 55.9 | −10.52 |
| 13 | | 1.435 | ASP | 0.500 | | | |
| 14 | IR-cut filter | Plano | | 0.200 | Glass | 1.517 | 64.2 | — |
| 15 | | Plano | | 0.206 | | | |
| 16 | Image | Plano | | — | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | 1.7777E−02 | 2.5651E+00 | −9.6913E+00 | 3.0000E+00 | 1.3373E−01 | −3.0000E+01 |
| A4 = | −5.5378E−03 | −3.9323E−02 | −2.6633E−02 | 3.7936E−02 | −1.4334E−01 | −5.4874E−02 |
| A6 = | 2.2755E−02 | 7.2467E−03 | 1.2884E−01 | 1.1367E−01 | 2.1603E−02 | −4.3615E−02 |
| A8 = | −5.3653E−02 | −7.8343E−02 | −8.9929E−02 | 2.9376E−02 | −1.6836E−03 | −1.9560E−02 |
| A10 = | −6.4636E−03 | −1.6917E−02 | −1.1774E−01 | −1.9857E−01 | −1.0185E−01 | −1.3977E−02 |
| A12 = | 7.1448E−02 | 4.2921E−02 | 2.1528E−01 | 2.4028E−01 | 3.9449E−02 | 7.4119E−03 |
| A14 = | −8.1454E−02 | −2.3617E−02 | −6.9862E−02 | −6.8907E−02 | 3.6964E−03 | 6.2646E−04 |

| Surface # | 8 | 9 | 10 | 11 | 12 | 13 |
|---|---|---|---|---|---|---|
| k = | −3.5889E+00 | 1.0809E+00 | −6.1343E+00 | −5.0872E−01 | −2.8636E+01 | −6.0609E+00 |
| A4 = | −1.0518E−01 | −1.5821E−01 | −1.4314E−01 | 2.4066E−02 | −1.6450E−01 | −5.8742E−02 |
| A6 = | −1.1659E−02 | 7.4805E−02 | −1.3044E−01 | −5.2926E−02 | 7.3238E−02 | 2.5704E−02 |
| A8 = | 2.9215E−02 | −6.8396E−03 | 2.0364E−01 | 2.2224E−02 | −4.2013E−02 | −9.3153E−03 |
| A10 = | −4.9359E−02 | 2.0751E−02 | −5.6319E−02 | 1.0836E−02 | 2.0905E−02 | 2.3146E−03 |
| A12 = | −2.1883E−02 | −4.0874E−03 | −1.3066E−02 | −2.4984E−03 | −5.8668E−03 | −3.8229E−04 |
| A14 = | 8.9444E−02 | −2.2685E−03 | 4.4874E−03 | −2.5175E−03 | 8.5313E−04 | 3.5575E−05 |
| A16 = | −3.9025E−02 | 4.5246E−04 | 3.8363E−04 | 6.7494E−04 | −5.0919E−05 | −1.3404E−06 |

In the optical imaging lens assembly according to the 7th embodiment, the definitions of the following parameters are the same as those stated in the 1st embodiment with corresponding values for the 7th embodiment. Moreover, these parameters can be calculated from Table 13 and Table 14 as the following values and satisfy the following relationships:

| | |
|---|---|
| f (mm) | 3.93 |
| Fno | 2.30 |
| HFOV (deg.) | 37.8 |
| V2 + V5 | 46.7 |
| CT3/CT6 | 0.49 |
| (T45 + SAG51)/CT5 | −1.61 |
| (R3 + R4)/(R3 − R4) | −1.78 |
| |(R5 − R6)/(R5 + R6)| + |(R9 − R10)/(R9 + R10)| | 7.55 |
| f/f5 | −0.25 |
| f6/f5 | 0.66 |
| SD/TD | 0.94 |
| ΣCT/TD | 0.75 |
| BFL/TTL | 0.17 |

8th Embodiment

Figure 15:
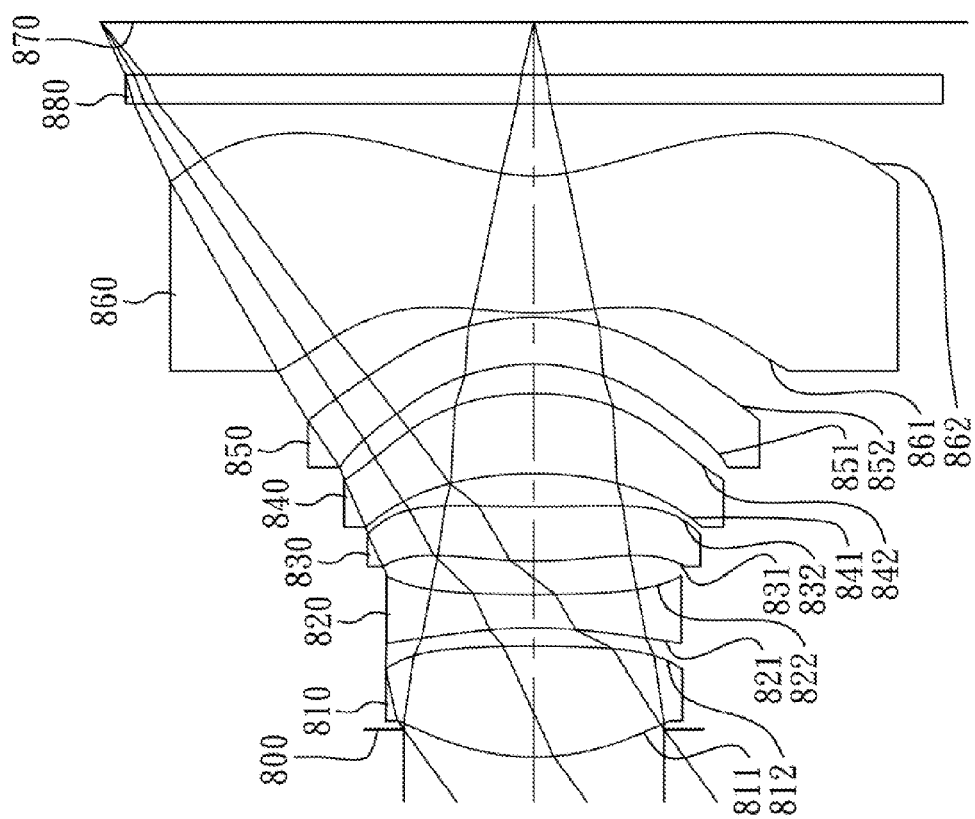
FIG. 15 is a schematic view of an optical imaging lens assembly according to the 8th embodiment of the present disclosure.
Figure 16:
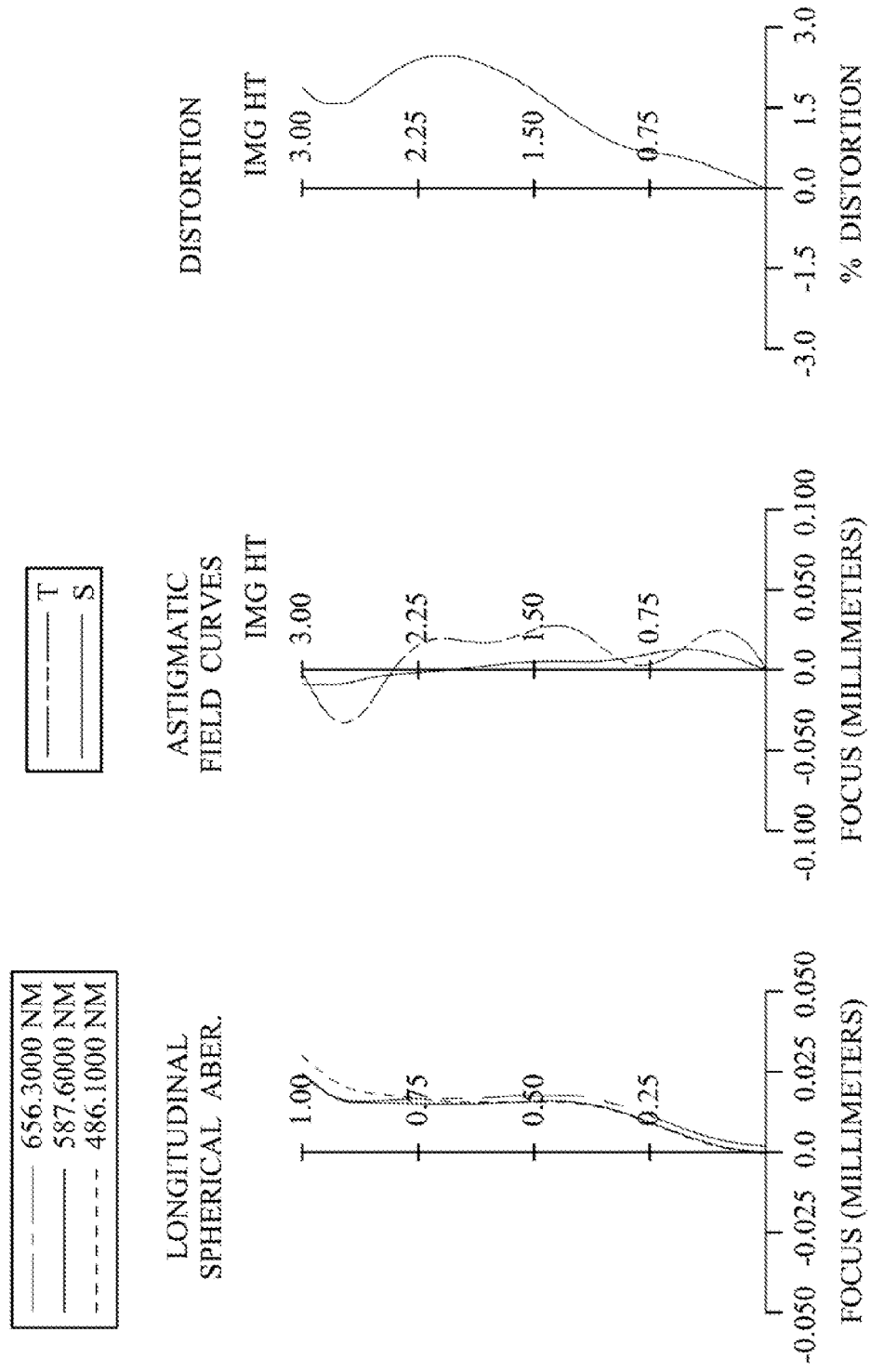
FIG. 16 shows spherical aberration curves, astigmatic field curves and a distortion curve of the optical imaging lens assembly according to the 8th embodiment.

FIG. 15 is a schematic view of an optical imaging lens assembly according to the 8th embodiment of the present disclosure. FIG. 16 shows spherical aberration curves, astigmatic field curves and a distortion curve of the optical imaging lens assembly according to the 8th embodiment. In FIG. 15, the optical imaging lens assembly includes, in order from an object side to an image side, a stop, which is an aperture stop 800, followed by a first lens element 810, a second lens element 820, a third lens element 830, a fourth lens element 840, a fifth lens element 850, a sixth lens element 860, an IR-cut filter 880 and an image plane 870.

The first lens element 810 with positive refractive power has a convex object-side surface 811 and a convex image-side surface 812. The first lens element 810 is made of plastic material, and has the object-side surface 811 and the image-side surface 812 being both aspheric.

The second lens element 820 with negative refractive power has a concave object-side surface 821 and a concave image-side surface 822. The second lens element 820 is made of plastic material, and has the object-side surface 821 and the image-side surface 822 being both aspheric. Furthermore, the second lens element 820 has at least one inflection point on the object-side surface 821 thereof.

The third lens element 830 with positive refractive power has a convex object-side surface 831 and a concave image-side surface 832, wherein the object-side surface 831 changes from convex at a paraxial region thereof to concave at a peripheral region thereof. The third lens element 830 is made of plastic material, and has the object-side surface 831 and the image-side surface 832 being both aspheric.

The fourth lens element 840 with positive refractive power has a concave object-side surface 841 and a convex image-side surface 842. The fourth lens element 840 is made of plastic material, and has the object-side surface 841 and the image-side surface 842 being both aspheric.

The fifth lens element 850 with negative refractive power has a concave object-side surface 851 and a convex image-side surface 852. The fifth lens element 850 is made of plastic material, and has the object-side surface 851 and the image-side surface 852 being both aspheric.

The sixth lens element 860 with negative refractive power has a convex object-side surface 861 and a concave image-side surface 862. The sixth lens element 860 is made of plastic material, and has the object-side surface 861 and the image-side surface 862 being both aspheric. Furthermore, the sixth lens element 860 has at least one inflection point on the image-side surface 862 thereof.

The IR-cut filter 880 is made of glass material and located between the sixth lens element 860 and the image plane 870, and will not affect the focal length of the optical imaging lens assembly.

The detailed optical data of the 8th embodiment are shown in Table 15 and the aspheric surface data are shown in Table 16 below.

TABLE 15

8th Embodiment
f = 3.97 mm, Fno = 2.20, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.187 | | | | |
| 2 | Lens 1 | 1.746 | ASP | 0.769 | Plastic | 1.544 | 55.9 | 2.82 |
| 3 | | −10.818 | ASP | 0.126 | | | | |
| 4 | Lens 2 | −3.373 | ASP | 0.233 | Plastic | 1.640 | 23.3 | −4.19 |
| 5 | | 13.453 | ASP | 0.228 | | | | |
| 6 | Lens 3 | 3.218 | ASP | 0.380 | Plastic | 1.530 | 55.8 | 8.14 |
| 7 | | 12.152 | ASP | 0.229 | | | | |
| 8 | Lens 4 | −2.792 | ASP | 0.555 | Plastic | 1.544 | 55.9 | 11.55 |
| 9 | | −2.068 | ASP | 0.205 | | | | |
| 10 | Lens 5 | −1.347 | ASP | 0.321 | Plastic | 1.530 | 55.8 | −18.54 |
| 11 | | −1.689 | ASP | 0.030 | | | | |
| 12 | Lens 6 | 2.169 | ASP | 0.953 | Plastic | 1.544 | 55.9 | −9.19 |
| 13 | | 1.279 | ASP | 0.500 | | | | |
| 14 | IR-cut filter | Plano | | 0.200 | Glass | 1.517 | 64.2 | — |
| 15 | | Plano | | 0.367 | | | | |
| 16 | Image | Plano | | — | | | | |

Note:
Reference wavelength (d-line) is 587.6 nm.

TABLE 16

| Aspheric Coefficients | | | | | | |
|---|---|---|---|---|---|---|
| Surface # | 2 | 3 | 4 | 5 | 6 | 7 |
| k = | −9.1263E−02 | −3.0000E+01 | −2.8746E+01 | −3.0000E+01 | −1.7079E+00 | −3.0000E+01 |
| A4 = | −1.1722E−02 | −4.2551E−02 | −3.0626E−02 | 1.6387E−02 | −1.5500E−01 | −5.5605E−02 |
| A6 = | 2.1259E−02 | 4.6027E−04 | 1.1853E−01 | 9.9822E−02 | 1.2161E−02 | −3.6769E−02 |
| A8 = | −5.6511E−02 | −7.3575E−02 | −1.0032E−01 | 1.7614E−02 | 2.2829E−02 | −1.1646E−02 |
| A10 = | −9.1757E−03 | −1.0768E−02 | −1.2878E−01 | −2.0723E−01 | −8.9234E−02 | −1.9074E−02 |
| A12 = | 7.1420E−02 | 4.6819E−02 | 2.0527E−01 | 2.3407E−01 | 3.9046E−02 | 6.8854E−03 |
| A14 = | −6.2451E−02 | −1.8693E−02 | −6.3014E−02 | −7.8244E−02 | 3.2983E−03 | 2.6470E−03 |
| Surface # | 8 | 9 | 10 | 11 | 12 | 13 |
| k = | −8.1482E+00 | 6.8620E−01 | −9.0254E+00 | −4.8985E−01 | −2.9874E+01 | −5.9733E+00 |
| A4 = | −9.9455E−02 | −1.7032E−01 | −1.8476E−01 | 3.2122E−02 | −1.6998E−01 | −6.1886E−02 |
| A6 = | 6.4068E−03 | 7.2072E−02 | −1.0849E−01 | −5.7075E−02 | 7.2459E−02 | 2.5216E−02 |
| A8 = | 1.9142E−02 | −9.1827E−03 | 2.0092E−01 | 2.2003E−02 | −4.2079E−02 | −9.2237E−03 |
| A10 = | −5.3749E−02 | 2.0914E−02 | −5.7594E−02 | 1.0871E−02 | 2.0922E−02 | 2.3335E−03 |
| A12 = | −2.3459E−02 | −3.9963E−03 | −1.3515E−02 | −2.4973E−03 | −5.8598E−03 | −3.8373E−04 |
| A14 = | 8.9452E−03 | −2.1773E−03 | 4.3002E−03 | −2.5143E−03 | 8.5458E−04 | 3.5257E−05 |
| A16 = | −3.8015E−02 | 5.0481E−04 | 2.7770E−04 | 6.7855E−04 | −5.0960E−05 | −1.3318E−06 |

In the optical imaging lens assembly according to the 8th embodiment, the definitions of the following parameters are the same as those stated in the 1st embodiment with corresponding values for the 8th embodiment. Moreover, these parameters can be calculated from Table 15 and Table 16 as the following values and satisfy the following relationships:

| | |
|---|---|
| f (mm) | 3.97 |
| Fno | 2.20 |
| HFOV (deg.) | 36.5 |
| V2 + V5 | 79.1 |
| CT3/CT6 | 0.40 |
| (T45 + SAG51)/CT5 | −1.60 |
| (R3 + R4)/(R3 − R4) | −0.60 |
| \|(R5 − R6)/(R5 + R6)\| + \|(R9 − R10)/(R9 + R10)\| | 0.69 |
| f/f5 | −0.21 |
| f6/f5 | 0.50 |
| SD/TD | 0.95 |
| ΣCT/TD | 0.80 |
| BFL/TTL | 0.20 |

9th Embodiment

Figure 17:
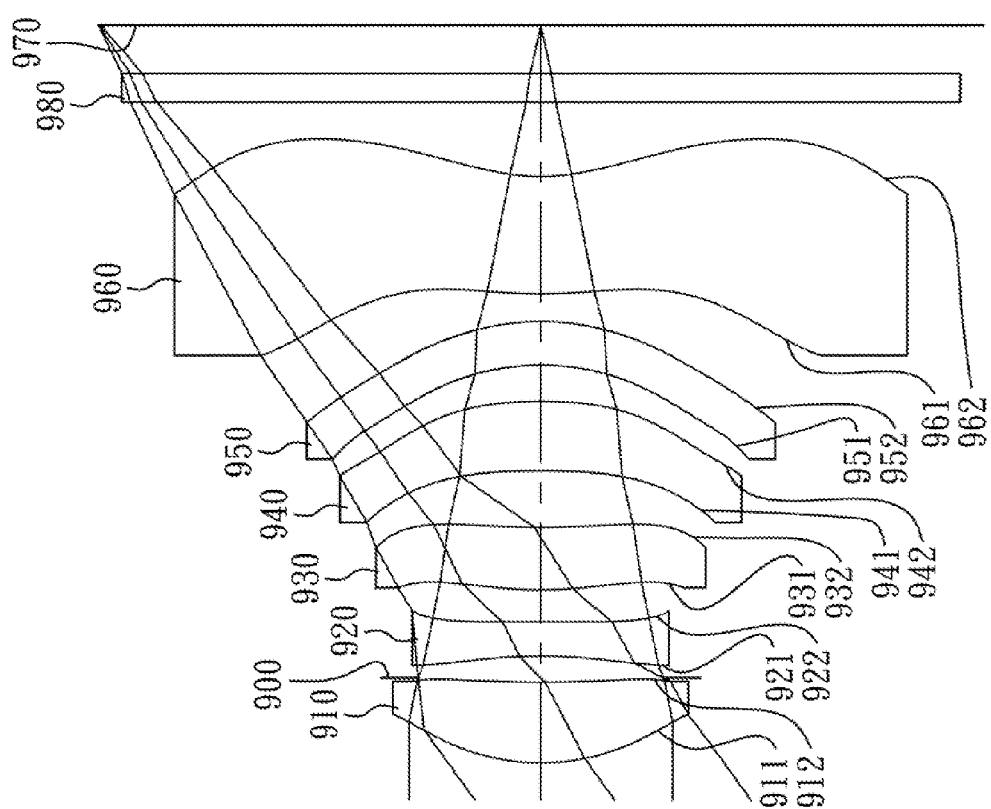
FIG. 17 is a schematic view of an optical imaging lens assembly according to the 9th embodiment of the present disclosure.
Figure 18:
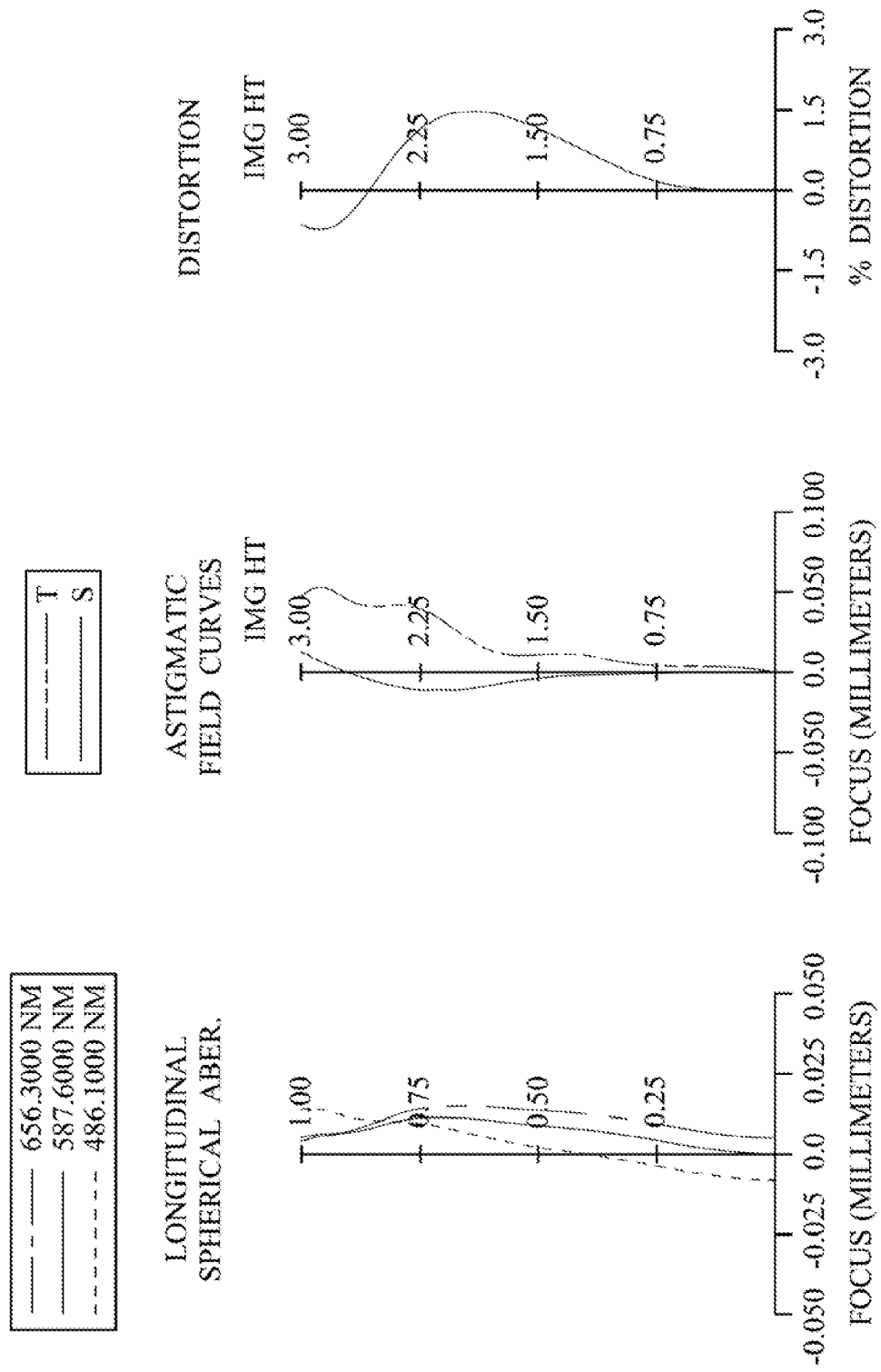
FIG. 18 shows spherical aberration curves, astigmatic field curves and a distortion curve of the optical imaging lens assembly according to the 9th embodiment.

FIG. 17 is a schematic view of an optical imaging lens assembly according to the 9th embodiment of the present disclosure. FIG. 18 shows spherical aberration curves, astigmatic field curves and a distortion curve of the optical imaging lens assembly according to the 9th embodiment. In FIG. 17, the optical imaging lens assembly includes, in order from an object side to an image side, a first lens element 910, a stop, which is an aperture stop 900, a second lens element 920, a third lens element 930, a fourth lens element 940, a fifth lens element 950, a sixth lens element 960, an IR-cut filter 980 and an image plane 970.

The first lens element 910 with positive refractive power has a convex object-side surface 911 and a concave image-side surface 912. The first lens element 910 is made of plastic material, and has the object-side surface 911 and the image-side surface 912 being both aspheric.

The second lens element 920 with negative refractive power has a concave object-side surface 921 and a convex image-side surface 922. The second lens element 920 is made of plastic material, and the object-side surface 921 and the image-side surface 922 being both aspheric. Furthermore, the second lens element 920 has inflection points on the object-side surface 921 and the image-side surface 922 thereof.

The third lens element 930 with positive refractive power has a convex object-side surface 931 and a concave image-side surface 932, wherein the object-side surface 931 changes from convex at a paraxial region thereof to concave at a peripheral region thereof. The third lens element 930 is made of plastic material, and has the object-side surface 931 and the image-side surface 932 being both aspheric.

The fourth lens element 940 with positive refractive power has a concave object-side surface 941 and a convex image-side surface 942. The fourth lens element 940 is made of plastic material, and has the object-side surface 941 and the image-side surface 942 being both aspheric.

The fifth lens element 950 with positive refractive power has a concave object-side surface 951 and a convex image-side surface 952. The fifth lens element 950 is made of plastic material, and has the object-side surface 951 and the image-side surface 952 being both aspheric.

The sixth lens element 960 with negative refractive power has a convex object-side surface 961 and a concave image-side surface 962. The sixth lens element 960 is made of plastic material, and has the object-side surface 961 and the image-side surface 962 being both aspheric. Furthermore, the sixth lens element 960 has at least one inflection point on the image-side surface 962 thereof.

The IR-cut filter 980 is made of glass material and located between the sixth lens element 960 and the image plane 970, and will not affect the focal length of the optical imaging lens assembly.

The detailed optical data of the 9th embodiment are shown in Table 17 and the aspheric surface data are shown in Table 18 below.

TABLE 17

9th Embodiment
f = 4.12 mm, Fno = 2.30, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.505 | ASP | 0.551 | Plastic | 1.544 | 55.9 | 3.32 |
| 2 | | 7.877 | ASP | 0.030 | | | | |
| 3 | Ape. Stop | Plano | | 0.148 | | | | |
| 4 | Lens 2 | −3.198 | ASP | 0.233 | Plastic | 1.640 | 23.3 | −5.54 |
| 5 | | −33.765 | ASP | 0.214 | | | | |
| 6 | Lens 3 | 2.756 | ASP | 0.427 | Plastic | 1.544 | 55.9 | 10.05 |
| 7 | | 5.252 | ASP | 0.381 | | | | |
| 8 | Lens 4 | −5.904 | ASP | 0.474 | Plastic | 1.544 | 55.9 | 12.75 |
| 9 | | −3.281 | ASP | 0.247 | | | | |
| 10 | Lens 5 | −1.621 | ASP | 0.293 | Plastic | 1.640 | 23.3 | 27.78 |
| 11 | | −1.590 | ASP | 0.191 | | | | |
| 12 | Lens 6 | 3.045 | ASP | 0.796 | Plastic | 1.544 | 55.9 | −5.13 |
| 13 | | 1.322 | ASP | 0.500 | | | | |
| 14 | IR-cut filter | Plano | | 0.200 | Glass | 1.517 | 64.2 | — |
| 15 | | Plano | | 0.328 | | | | |
| 16 | Image | Plano | | — | | | | |

Note:
Reference wavelength (d-line) is 587.6 nm

TABLE 18

Aspheric Coefficients

| Surface # | 1 | 2 | 4 | 5 | 6 | 7 |
|---|---|---|---|---|---|---|
| k = | 1.1162E−02 | 3.0000E+00 | −2.6513E+01 | −1.0000E+00 | 1.8435E+00 | −2.0276E+00 |
| A4 = | −5.4259E−03 | −3.7652E−02 | −1.3367E−02 | 5.5187E−02 | −1.8003E−01 | −9.5362E−02 |
| A6 = | 2.2173E−02 | 6.9646E−03 | 1.3406E−01 | 1.1768E−01 | 2.4336E−02 | −1.1830E−02 |
| A8 = | −5.3259E−02 | −7.6244E−02 | −8.7537E−02 | 3.1339E−02 | 5.4633E−03 | −3.6136E−02 |
| A10 = | −7.1276E−03 | −1.3402E−02 | −1.1600E−01 | −1.9481E−01 | −9.8192E−02 | −8.7587E−03 |
| A12 = | 7.1640E−02 | 4.6237E−02 | 2.1750E−01 | 2.4552E−01 | 4.1120E−02 | 1.0430E−02 |
| A14 = | −7.8642E−02 | −2.0606E−02 | −6.9879E−02 | −6.3054E−02 | 1.0693E−03 | −1.2422E−03 |

| Surface # | 8 | 9 | 10 | 11 | 12 | 13 |
|---|---|---|---|---|---|---|
| k = | 2.5807E+00 | 2.8003E+00 | −4.7069E+00 | −5.8426E−01 | −3.0000E+01 | −6.5276E+00 |
| A4 = | −1.2810E−01 | −2.0372E−01 | −8.3621E−02 | 6.5929E−02 | −1.6203E−01 | −6.8095E−02 |
| A6 = | 1.5793E−02 | 7.4086E−02 | −1.3200E−01 | −5.6587E−02 | 7.2428E−02 | 2.6586E−02 |
| A8 = | 1.9166E−02 | −6.4050E−04 | 1.9544E−01 | 1.8889E−02 | −4.2130E−02 | −9.2689E−03 |
| A10 = | −5.5433E−02 | 2.0315E−02 | −5.6592E−02 | 1.0177E−02 | 2.0878E−02 | 2.3026E−03 |
| A12 = | −2.1938E−02 | −4.7235E−03 | −1.2995E−02 | −2.5217E−03 | −5.8730E−03 | −3.8250E−04 |
| A14 = | 8.9848E−02 | −2.7106E−03 | 4.4932E−03 | −2.4691E−03 | 8.5372E−04 | 3.5624E−05 |
| A16 = | −3.9010E−02 | 2.4445E−04 | 4.1237E−04 | 7.0593E−04 | −5.0213E−05 | −1.3307E−06 |

In the optical imaging lens assembly according to the 9th embodiment, the definitions of the following parameters are the same as those stated in the 1st embodiment with corresponding values for the 9th embodiment. Moreover, these parameters can be calculated from Table 17 and Table 18 as the following values and satisfy the following relationships:

| | |
|---|---|
| f (mm) | 4.12 |
| Fno | 2.30 |
| HFOV (deg.) | 36.2 |
| V2 + V5 | 46.6 |
| CT3/CT6 | 0.54 |
| (T45 + SAG51)/CT5 | −1.36 |
| (R3 + R4)/(R3 − R4) | −1.21 |
| \|(R5 − R6)/(R5 + R6)\| + \|(R9 − R10)/(R9 + R10)\| | 0.32 |
| f/f5 | 0.15 |
| f6/f5 | −0.18 |
| SD/TD | 0.85 |
| ΣCT/TD | 0.70 |
| BFL/TTL | 0.19 |

It will be apparent to those skilled in the art that various modifications and variations can be made to the structure of the present invention without departing from the scope or spirit of the present disclosure. In view of the foregoing, it is intended that the present disclosure cover modifications and variations of this disclosure provided they fall within the scope of the following claims.

What is claimed is:

1. An optical imaging lens assembly comprising, in order from an object side to an image side:
a first lens element with positive refractive power having a convex object-side surface;
a second lens element with negative refractive power having a concave object-side surface;
a third lens element with refractive power;
a fourth lens element with refractive power;
a fifth lens element with refractive power having a concave object-side surface and a convex image-side surface, wherein at least one of the object-side surface and the image-side surface of the fifth lens element is aspheric; and
a sixth lens element with refractive power having a concave image-side surface, wherein an object-side surface and the image-side surface of the sixth lens element are aspheric, and the sixth lens element has at least one inflection point on the image-side surface thereof;
wherein a curvature radius of the object-side surface of the second lens element is R3, a curvature radius of an image-side surface of the second lens element is R4, a focal length of the optical imaging lens assembly is f, a focal length of the fifth lens element is f5, and the following relationships are satisfied:

$$-5.0 < (R3+R4)/(R3-R4) < -0.4; \text{ and}$$

$$-1.5 < f/f5 < 0.8.$$

2. The optical imaging lens assembly of claim 1, wherein the fourth lens element has a convex image-side surface.

3. The optical imaging lens assembly of claim 2, wherein the sixth lens element has negative refractive power.

4. The optical imaging lens assembly of claim 3, wherein the object-side surface of the sixth lens element is convex.

5. The optical imaging lens assembly of claim 2, wherein the fourth lens element has positive refractive power.

6. The optical imaging lens assembly of claim 5, wherein the fifth lens element has negative refractive power.

7. The optical imaging lens assembly of claim 2, wherein the image-side surface of the second lens element is convex.

8. The optical imaging lens assembly of claim 7, wherein the first lens element has a concave image-side surface.

9. The optical imaging lens assembly of claim 1, wherein the focal length of the optical imaging lens assembly is f, the focal length of the fifth lens element is f5, and the following relationship is satisfied:

$$-1.2 < f/f5 < 0.4.$$

10. The optical imaging lens assembly of claim 9, wherein a central thickness of the third lens element is CT3, a central thickness of the sixth lens element is CT6, and the following relationship is satisfied:

$$0 < CT3/CT6 < 1.0.$$

11. The optical imaging lens assembly of claim 9, wherein a curvature radius of an object-side surface of the third lens element is R5, a curvature radius of an image-side surface of the third lens element is R6, a curvature radius of the object-side surface of the fifth lens element is R9, a curvature radius of the image-side surface of the fifth lens element is R10, and the following relationship is satisfied:

$|(R5-R6)/(R5+R6)|+|(R9-R10)/(R9+R10)|<0.70.$

12. The optical imaging lens assembly of claim 9, wherein the curvature radius of the object-side surface of the second lens element is R3, the curvature radius of the image-side surface of the second lens element is R4, and the following relationship is satisfied:

$-3.5<(R3+R4)/(R3-R4)<-0.75.$

13. The optical imaging lens assembly of claim 9, wherein an object-side surface and an image-side surface of the third lens element are aspheric, and the object-side surface of the third lens element changes from convex at a paraxial region thereof to concave at a peripheral region thereof.

14. The optical imaging lens assembly of claim 9, further comprising:
a stop, wherein an axial distance between the stop and the image-side surface of the sixth lens element is SD, an axial distance between the object-side surface of the first lens element and the image-side surface of the sixth lens element is TD, and the following relationship is satisfied:

$0.80<SD/TD<1.05.$

15. The optical imaging lens assembly of claim 9, wherein the focal length of the fifth lens element is f5, a focal length of the sixth lens element is f6, and the following relationship is satisfied:

$-0.3<f6/f5<1.1.$

16. The optical imaging lens assembly of claim 1, wherein the fifth lens element has negative refractive power.

17. The optical imaging lens assembly of claim 16, wherein a curvature radius of an object-side surface of the third lens element is R5, a curvature radius of an image-side surface of the third lens element is R6, a curvature radius of the object-side surface of the fifth lens element is R9, a curvature radius of the image-side surface of the fifth lens element is R10, and the following relationship is satisfied:

$|(R5-R6)/(R5+R6)|+|(R9-R10)/(R9+R10)|<0.70.$

18. The optical imaging lens assembly of claim 16, wherein an Abbe number of the second lens element is V2, an Abbe number of the fifth lens element is V5, and the following relationship is satisfied:

$30<V2+V5<57.$

19. The optical imaging lens assembly of claim 16, wherein the curvature radius of the object-side surface of the second lens element is R3, the curvature radius of the image-side surface of the second lens element is R4, and the following relationship is satisfied:

$-2.5<(R3+R4)/(R3-R4)<-0.95.$

20. The optical imaging lens assembly of claim 16, wherein an axial distance between the image-side surface of the sixth lens element and an image plane is BFL, an axial distance between the object-side surface of the first lens element and the image plane is TTL, and the following relationship is satisfied:

$0.10<BFL/TTL<0.23.$

21. The optical imaging lens assembly of claim 16, wherein at least one of the object-side surface and the image-side surface of the second lens element has at least one inflection point.

22. The optical imaging lens assembly of claim 2, wherein an axial distance between the fourth lens element and the fifth lens element is T45, a central thickness of the fifth lens element is CT5, a distance in parallel with an optical axis from a maximum effective diameter position on the object-side surface of the fifth lens element to an axial vertex on the object-side surface of the fifth lens element is SAG51, and the following relationship is satisfied:

$-2.5<(T45+SAG51)/CT5<-0.9.$

23. The optical imaging lens assembly of claim 1, wherein a sum of the central thicknesses of the first lens element, the second lens element, the third lens element, the fourth lens element, the fifth lens element and the sixth lens element is ΣCT, an axial distance between the object-side surface of the first lens element and the image-side surface of the sixth lens element is TD, and the following relationship is satisfied:

$0.65<\Sigma CT/TD<0.85.$

* * * * *

UNITED STATES PATENT AND TRADEMARK OFFICE
CERTIFICATE OF CORRECTION

PATENT NO.         : 8,743,482 B1
APPLICATION NO.    : 13/773645
DATED              : June 3, 2014
INVENTOR(S)        : Tsung-Han Tsai and Hsin-Hsuan Huang Page 1 of 1

It is certified that error appears in the above-identified patent and that said Letters Patent is hereby corrected as shown below:

In the Claims (1) In column 32, line 55, Claim 9 of the issued patent reads as "−1.2<f/f<0.4", but it should read as "−1.2<f/f5<0.4".

Signed and Sealed this
Seventh Day of October, 2014

Michelle K. Lee
*Deputy Director of the United States Patent and Trademark Office*